US011062485B2

(12) United States Patent
Kim

(10) Patent No.: US 11,062,485 B2
(45) Date of Patent: Jul. 13, 2021

(54) DISPLAY PROCESSING METHOD AND DEVICE FOR APPLYING AN ATTRIBUTE OF A REFERENCE IMAGE TO A TARGET IMAGE

(71) Applicant: Samsung Electronics Co., Ltd., Suwon-si (KR)

(72) Inventor: Jaein Kim, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/636,197

(22) PCT Filed: Aug. 28, 2018

(86) PCT No.: PCT/KR2018/009921
§ 371 (c)(1),
(2) Date: Feb. 3, 2020

(87) PCT Pub. No.: WO2019/045415
PCT Pub. Date: Mar. 7, 2019

(65) Prior Publication Data
US 2020/0372688 A1 Nov. 26, 2020

(30) Foreign Application Priority Data

Aug. 28, 2017 (KR) .................. 10-2017-0108494

(51) Int. Cl.
*G06T 11/00* (2006.01)
*G06T 7/90* (2017.01)
*G06F 3/041* (2006.01)

(52) U.S. Cl.
CPC .............. *G06T 11/001* (2013.01); *G06T 7/90* (2017.01); *G06F 3/041* (2013.01); *G06F 2203/04105* (2013.01); *G06T 2200/24* (2013.01)

(58) Field of Classification Search
None
See application file for complete search history.

(56) References Cited

U.S. PATENT DOCUMENTS

2010/0083174 A1  4/2010  Lee et al.
2011/0225549 A1  9/2011  Kim
(Continued)

FOREIGN PATENT DOCUMENTS

KR   10-2010-0035474 A    4/2010
KR   10-2015-0007137 A    1/2015
(Continued)

*Primary Examiner* — Steven Z Elbinger
(74) *Attorney, Agent, or Firm* — Jefferson IP Law, LLP

(57) ABSTRACT

Disclosed are a method and an apparatus for providing a representative image of content in a content view displayed by an electronic device. The electronic device includes: a display device configured to display a content view; and a processor, wherein the processor is configured to acquire item information related to items in a content view in response to detection of a request for executing the content view, divide the items into a reference item and a target item in the content view based on the acquired item information, acquire representative information based on the reference item, and configure a color-based representative image of the target item based at least partially on the acquired representative information. Various embodiments are possible.

13 Claims, 18 Drawing Sheets

(56) References Cited

U.S. PATENT DOCUMENTS

| | | | |
|---|---|---|---|
| 2012/0050484 A1* | 3/2012 | Boross | H04N 13/261 348/46 |
| 2014/0320516 A1* | 10/2014 | Son | G06F 3/04817 345/589 |
| 2016/0266731 A1 | 9/2016 | Zhao et al. | |
| 2016/0342291 A1 | 11/2016 | Kim et al. | |
| 2018/0338066 A1* | 11/2018 | Tsuwano | H04N 1/40068 |

FOREIGN PATENT DOCUMENTS

| | | | |
|---|---|---|---|
| KR | 20150007137 A | * | 1/2015 |
| KR | 10-2016-0136726 A | | 11/2016 |
| KR | 10-1677621 B1 | | 11/2016 |

\* cited by examiner

DISPLAY PROCESSING METHOD AND DEVICE FOR APPLYING AN ATTRIBUTE OF A REFERENCE IMAGE TO A TARGET IMAGE

TECHNICAL FIELD

The present disclosure relates to a method and an apparatus for providing a representative image of content in a content view displayed by an electronic device.

BACKGROUND ART

Recently, with the development of digital technology, various types of electronic devices, such as mobile communication terminals, smart phones, tablet Personal Computers (PCs), notebooks, Personal Digital Assistants (PDAs), wearable devices, digital cameras, or PCs, have come to be widely used.

The electronic device may include various kinds of content, and a content view may be provide for each attribute (or category) of the content. The content may include music, photos, notes (or memos), files, or videos that are stored in the electronic device or acquired from the outside (for example, a server or a provider) thereof and then provided through the electronic device. The electronic device may divide and store categories according to attributes of each piece of content and display the stored content through a relevant content view. Recently, when displaying one or more pieces of content in the content view, the electronic device may provide the content on the basis of representative information (for example, a representative image or a representative color) for identifying (or representing) each piece of content.

DISCLOSURE OF INVENTION

Technical Problem

However, not all the content has representative information in the content view, and an item of the content having no representative information may be processed and provided as a blank or a single color (for example, black). Accordingly, when an item having representative information and an item having no representative information coexist in the content view, aesthetics may deteriorate due to disharmony of representative information between items. Further, a particular content view is provided such that representative information is configured and expressed according to a user selection. However, in such a method, representative information may be configured only for content selected by the user, and the user is required to configure representative information for every piece of content, which inconveniences the user. Accordingly, users' needs for aesthetics/intuitiveness of the content view have increased.

According to various embodiments, a method and an apparatus for providing representative information of content (for example, a representative image or a representative color) in a content view displayed by the electronic device are disclosed.

According to various embodiments, when the electronic device provides a content view, a method and an apparatus for configuring and providing color-based representative information of an item having no representative information on the basis of the color of an item having representative information are disclosed.

Solution to Problem

In accordance with an aspect of the present disclosure, an electronic device is provided. The electronic device includes: a display device configured to display a content view; and a processor, wherein the processor is configured to acquire item information related to items in a content view in response to detection of a request for executing the content view, divide the items into a reference item and a target item in the content view based on the acquired item information, acquire representative information based on the reference item, and configure a color-based representative image of the target item based at least partially on the acquired representative information.

In accordance with another aspect of the present disclosure, a method of operating an electronic device is provided. The method includes: acquiring item information related to items in a content view in response to detection of a request for executing the content view; dividing the items into a reference item and a target item in the content view based on the acquired item information; acquiring representative information based on the reference item; and configuring a color-based representative image of the target item based at least partially on the acquired representative information.

In order to solve the technical problem, various embodiments of the present disclosure may include a computer-readable recording medium having a program recorded therein in order to perform the method by a processor.

Advantageous Effects of Invention

Based on an electronic device and a method of operating the same according to various embodiments, with respect to a target item for configuring representative information in the content view, the electronic device can configure representative information on the basis of the color of a reference item. According to various embodiments, the electronic device may change (apply) and provide a target item of the content view on the basis of a color of an adjacent/nearby reference item, thereby configuring and providing a color-based representative image even with respect to a target item having no representative information. Therefore, it is possible to improve user intuitiveness and aesthetics in the content view provided by the electronic device.

BEST MODE FOR CARRYING OUT THE INVENTION

Figure 1:
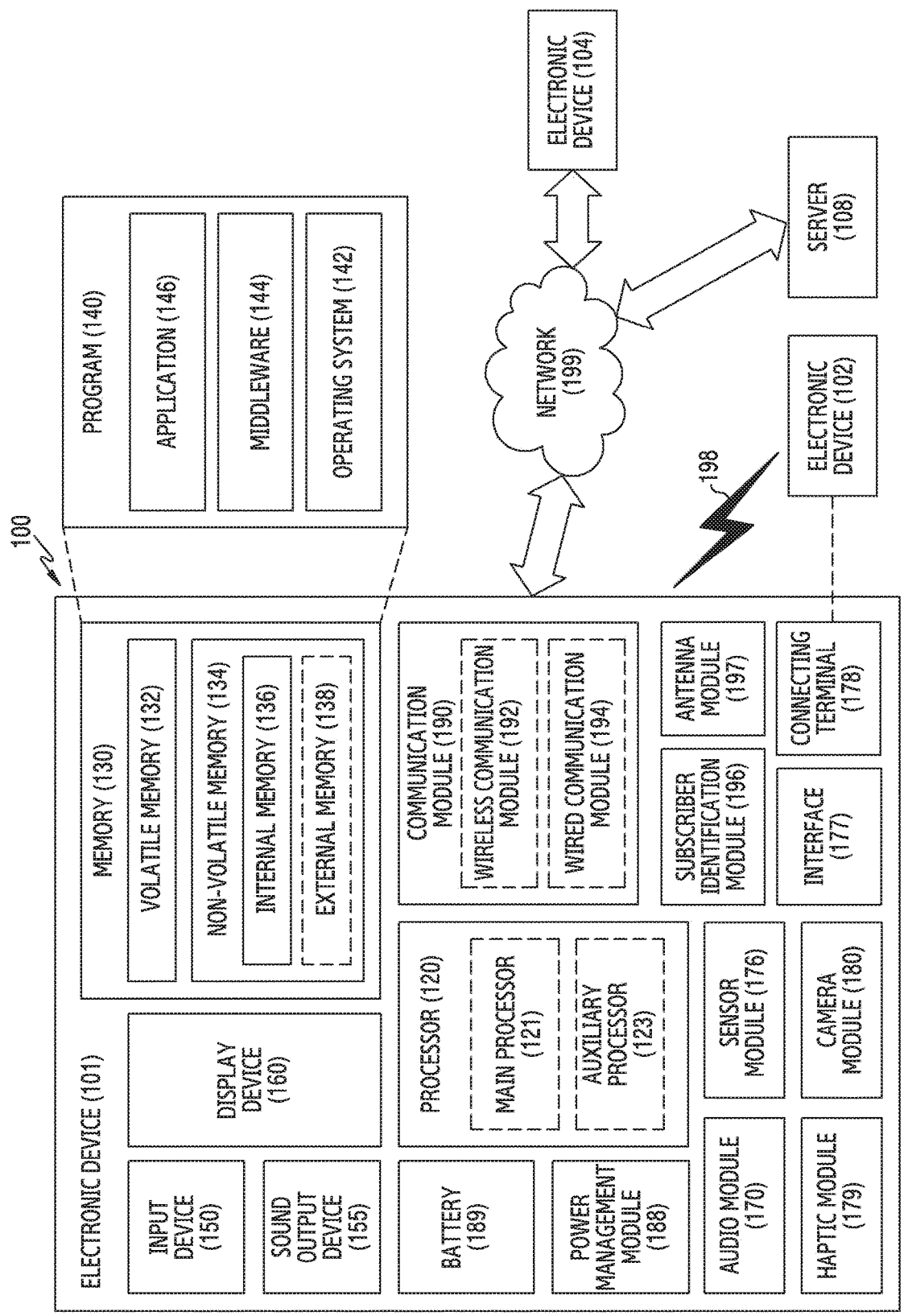
FIG. 1 is a block diagram illustrating an electronic device within a network environment according to various embodiments.

Hereinafter, various embodiments of the present disclosure will be described with reference to the accompanying drawings. The examples and terms used herein are not intended to limit the techniques described in this document to specific embodiments, but should be understood to include various modifications, equivalents, and/or substitutes of the embodiments. In connection with the description of the drawings, similar reference numerals may be used for similar components. And the embodiments disclosed in the present invention are presented for the explanation and understanding of the disclosed technical content, it is not intended to limit the scope of the technology described in the present invention. Accordingly, the scope of the present invention should be construed as including all changes or various other embodiments based on the technical spirit of the present invention.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
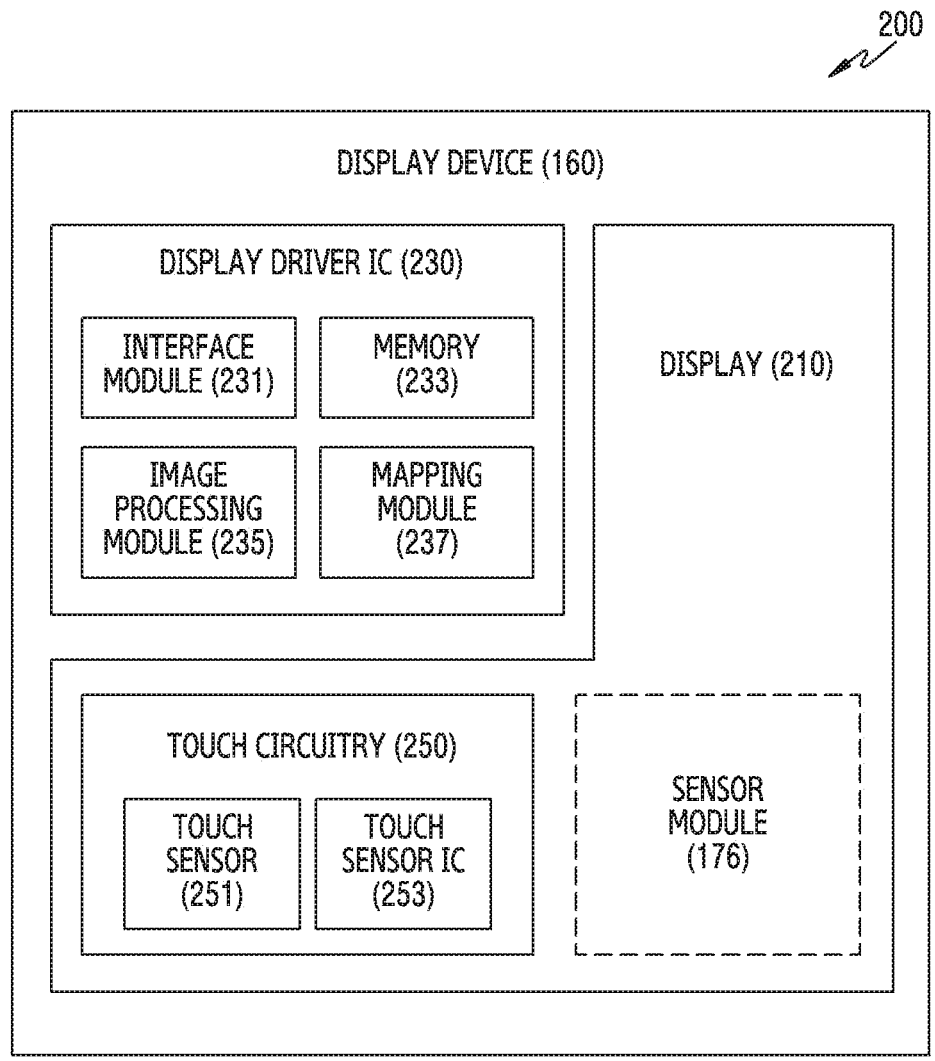
FIG. 2 is a block diagram illustrating a display device according to various embodiments.

FIG. 2 is a block diagram 200 illustrating the display device 160 according to various embodiments.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237.

The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160.

For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
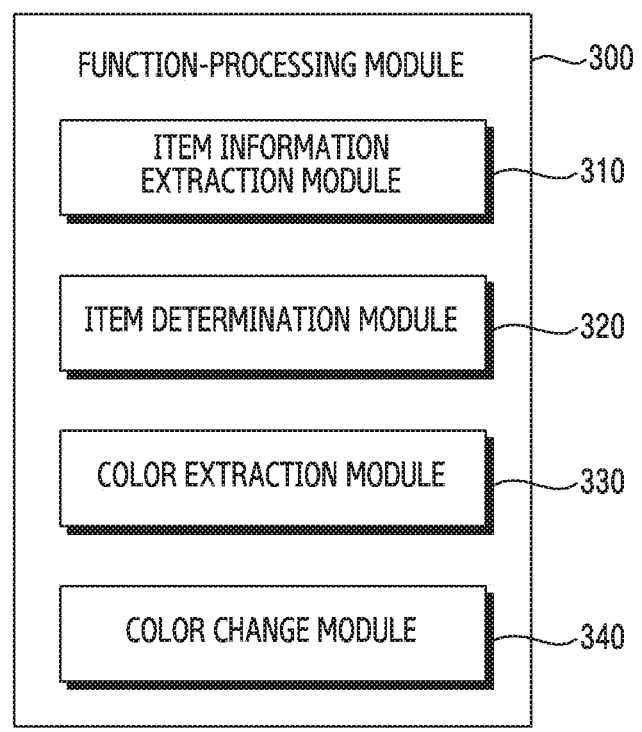
FIG. 3 illustrates an example of a function-processing module of an electronic device according to various embodiments of the present disclosure.

FIG. 3 illustrates an example of a function-processing module of an electronic device according to various embodiments of the present disclosure.

As illustrated in FIG. 3, FIG. 3 illustrates an example of a function-processing module 300 for configuring and providing representative information of content, which has no representative information (for example, a representative image, a cover image, or a representative color), on the basis of a color in the vicinity of (for example, adjacent to or near) content when an electronic device (for example, the electronic device 101 of FIG. 1) according to various embodiments provides a content view. According to various embodiments, the function-processing module 300 may be included as a hardware module or a software module in the processor (for example, the processor 120 of FIG. 1) having processing circuitry.

Referring to FIG. 3, the function-processing module 300 may process an operation of providing a color-based representative image. According to various embodiments, the function-processing module 300 may be a module for processing a display of a UI or a GUI related to various embodiments through the display device 160 (for example, the display 210). The function-processing module 300 may include an item information extraction module 310, an item determination module 320, a color extraction module 330, and a color change module 340.

The item information extraction module 310 may extract information related to (associated with) an item provided to identify each piece of content in a content view displayed through the display device 160. The information related to the item may include information on the existence or non-existence of representative information and/or information related to the display state (for example, a loading state for the display) of the representative information. According to an embodiment, the item information extraction module 310 may determine whether there is representative information corresponding to the item, or may determine that there is representative information and whether the representative information is currently being loaded.

According to various embodiments, the item may be provided in various forms, such as those of a card, a thumbnail, or a folder. According to an embodiment, the item may be provided differently according to a scheme of displaying a content view or according to attributes (or categories) (for example, music, photo, video, or folder) of content based on settings. According to an embodiment, the content view may be provided in various forms such as a card array type (for example, a card view), a matrix array type (for example, a grid view), and a listing array type (for example, a list view), and the form of the item indicating content may vary depending on the manner in which the content view is displayed.

The item determination module 320 may determine the type of item on the basis of information extracted (determined) by the item information extraction module 310. The item determination module 320 may determine (distinguish) a reference item and a target item in the content view. The item determination module 320 may distinguish the reference item and the target item on the basis of whether an item corresponding to content has representative information. According to various embodiments, one or more reference items and one or more target items may or may not be included in the content view.

According to various embodiments, the reference item may include an item displayed in the content view on the basis of the representative information. For example, the reference item may be an item displayed to identify content on the basis of representative information (for example, a representative image) of the content. According to various embodiments, the target item may include an item which does not have representative information in the content view and/or an item which has representative information but to which the representative information is not applied in the content view. For example, the target item may indicate a target of which content cannot be identified and to which corresponding representative information, which has been configured on the basis of representative information of a neighboring item, is applied. According to an embodiment, an item to which representative information has not been applied may be an item in the state before the representative information is actually applied to the item and displayed, for example, because the representative information of the item is being loaded or content is being downloaded from the outside (for example, another electronic device or a server).

The color extraction module 330 may extract a color on the basis of representative information of the reference item determined by the item determination module 320. When the number of reference items is plural, the color extraction module 330 may extract respective colors corresponding to the plurality of reference items. According to an embodiment, when the reference item is not included in the content view, the color extraction module 330 may be configured to extract a preset default color. According to an embodiment, when all items are reference items in the content view (or when the target item is not included in the content view), the color extraction module 330 may not perform the operation of extracting the color of the reference item.

The color change module 340 may change (or apply) the color of the target item on the basis of the color extracted by the color extraction module 330. The color change module 340 may configure the color of the target item on the basis of a color of at least one reference item adjacent (or next) to the corresponding target item or near (or close to) the corresponding target item. The color change module 340 may apply a color, which is the same as or associated with the color of the reference item, to the target item. The color change module 340 may apply the color of the target item between two adjacent reference items (for example, a first reference item adjacent to an upper part of the target item and a second reference item adjacent to a lower part of the target item) on the basis of the colors of the two reference items. The color change module 340 may gradually (or sequentially) apply the colors of the target items having orders on the basis of the color of the reference item.

According to an embodiment, when the target item is not included in the content view, the color change module 340 may not perform the operation of changing the color.

According to an embodiment, the color of the target item may be configured to correspond to the color of the reference item or to be harmonized with (for example, color-balanced) the color of the reference item by sequentially changing the color of the reference item. For example, the color may include attributes such as hue, brightness, and saturation (for example, three attributes of color), and the color change module 340 may change the color of the target item on the basis of at least one of the attributes of color.

According to various embodiments, configuring and providing the color of the target item on the basis of the color of the reference item will be described in detail with reference to the following drawings.

According to various embodiments, the electronic device 101 may change (apply) and provide the target item of the content view on the basis of the color of the adjacent/nearby reference item, thereby configuring and providing a color-based representative image associated with the color of the adjacent/nearby reference item even with respect to a target item having no representative information.

Figure 4:
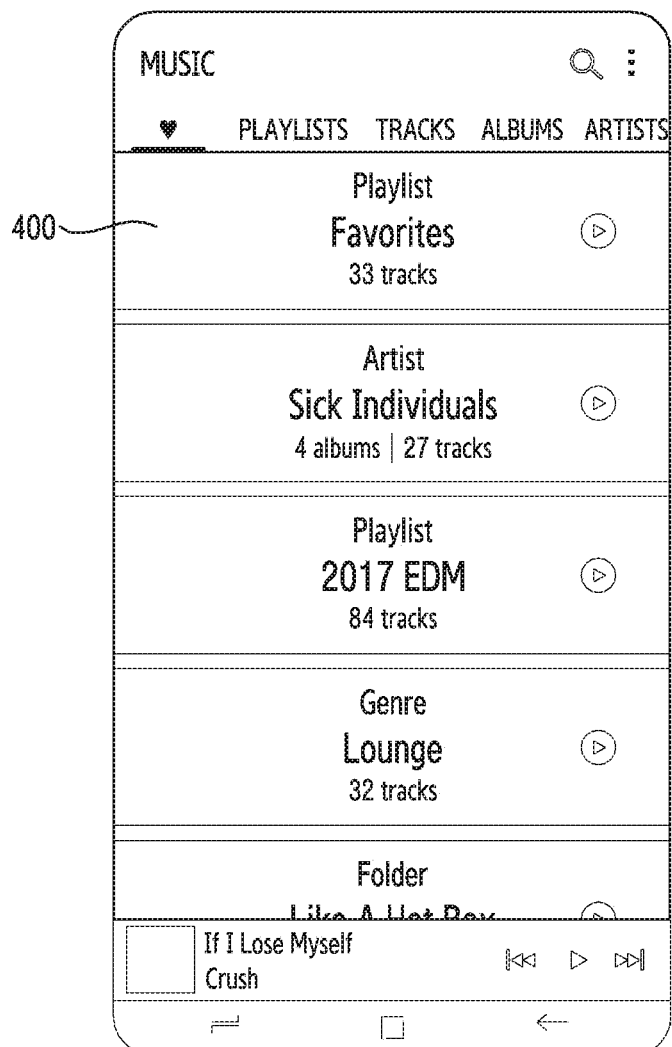
FIGS. 4, 5, and 6 illustrate examples in which content is displayed through a content view provided by an electronic device according to various embodiments of the present disclosure.
Figure 5:
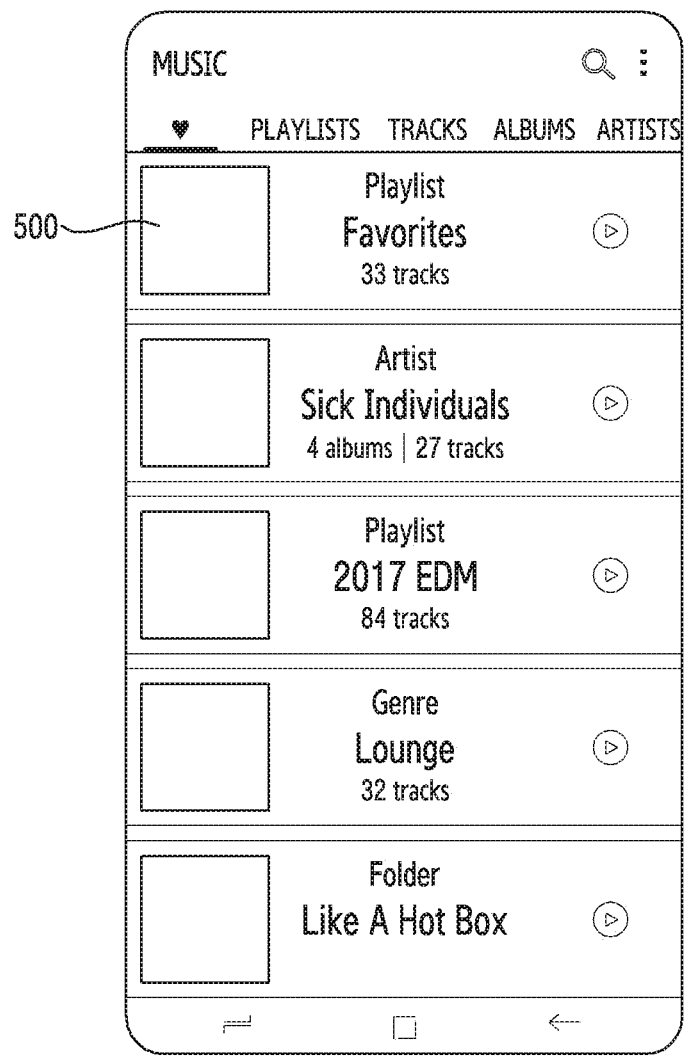
Figure 6:
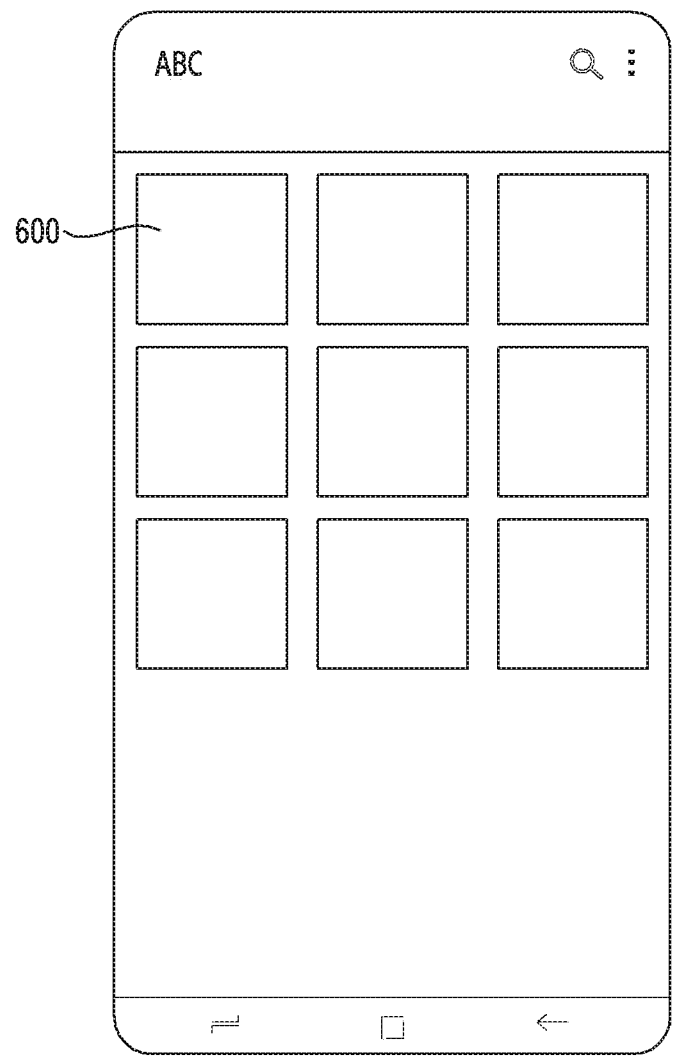

FIGS. 4, 5, and 6 illustrate examples in which content is displayed through a content view provided by an electronic device according to various embodiments of the present disclosure.

FIGS. 4, 5, and 6 illustrate examples of screens (for example, UIs or GUIs) on which a relevant content view corresponding to execution of an application (for example, an application for reproducing music, an application for displaying an album, an application for reproducing a video, an application for displaying my files, an application for displaying contact information, and an application for an Artificial Intelligence (AI) service) by a user is displayed through the display device 106 in the electronic device 101.

According to an embodiment, the electronic device 101 may display a content view corresponding to a configured type through the display device 160 in response to user input (for example, input for displaying a content view). According to an embodiment, the electronic device 101 may provide a relevant content view intended by the user on the basis of an interaction with the user.

According to various embodiments, the content view may be provided in various forms, such as a card array type (for example, a card view), a matrix array type (for example, a grid view), and a listing array type (for example, a list view). According to various embodiments, content which is a view element constituting the content view may be displayed on the basis of various item forms according to the type of the content view. According to an embodiment, in the case of the card view, representative information of corresponding content may be provided on the basis of an item in a card form. According to an embodiment, in the case of the grid view and/or the list view, representative information of corresponding content may be provided on the basis of an item in a thumbnail form.

According to an embodiment, FIG. 4 illustrates an example in which a content view is provided in a card array type (for example, a card view). In the case of the content view in the card array type, each view element (for example, a card-type object 400 in FIG. 4 (for example, a music album cover)) constituting the content view may indicate an item according to various embodiments. The electronic device 101 may provide an item corresponding to content on the basis of the card-type object 400 in the content view.

According to an embodiment, FIG. 5 illustrates an example in which a content view is provided in a list array type (for example, a list view). In the case of the content view in the list array type, each view element (for example, a representative image indicating content in FIG. 5 (for example, a thumbnail object 500 (for example, a music album cover or an image based on a contact profile))) constituting the content view may indicate an item according to various embodiments. The electronic device 101 may provide an item corresponding to content on the basis of the thumbnail object 500 in the content view.

According to an embodiment, FIG. 6 illustrates an example in which a content view is provided in a matrix array type (for example, a grid view). In the case of the content view in the matrix array type, each view element (for example, a tile-type object 600 in FIG. 6 (for example, a folder or a file) constituting the content view may indicate an item according to various embodiments. The electronic device 101 may provide an item corresponding to content on the basis of the tile-type object 600 in the content view.

As described with reference to FIGS. 4, 5, and 6, according to various embodiments, the content view (or the view) indicates a group of content having the same attributes (for example, the type or category) and may be provided in one of various types. According to various embodiments, the manner in which the view is provided is not limited to the examples of FIGS. 4, 5, and 6, and may be implemented in various manners of providing the view.

According to various embodiments, content for the content view may include various types that can be displayed through the content view. For example, content may refer to a file itself, such as music, photos, notes (or memos), messages, or videos, refer to a folder including files, or refer to various pieces of information or content contained therein provided (for example, displayed) through a particular application. According to various embodiments, the content may include various kinds of content that can be expressed on the basis of representative information (for example, a representative image or a representative color) indicating content through the content view.

As described above, an electronic device according to various embodiments may include the display device 160 configured to display a content view; and the processor 120, wherein the processor 120 may be configured to acquire item information related to items in a content view in response to detection of a request for executing the content view, divide the items into a reference item and a target item in the content view based on the acquired item information, acquire representative information based on the reference item, and configure a color-based representative image of the target item based at least partially on the acquired representative information.

According to various embodiments, the reference item may include an item displayed based on representative information in the content view, and the target item may include an item having no representative information in the content view or an item which has representative information but to which the representative information has not been applied in the content view.

According to various embodiments, the item information may include information related to the existence or non-existence of the representative information or information on a display state of the representative information.

According to various embodiments, the processor 120 may be configured to determine the reference item and the target item according to whether the items have representative information in the content view.

According to various embodiments, the processor 120 may be configured to determine a state of the reference item having the representative information and include the reference item in the target item based on a state of the reference item.

According to various embodiments, when a number of reference items is plural, the processor 120 may be configured to extract a color corresponding to each of a plurality of reference items and determine a color of the target item based on a color of at least one reference item adjacent to or near the target item.

According to various embodiments, when a single reference item is included in the content view, the processor 120 may be configured to sequentially apply a color of at least one target item from a target item adjacent to the reference item to a target item near the reference item based on a color of the single reference item.

According to various embodiments, when a plurality of reference items is included in the content view, the processor 120 may be configured to extract a color corresponding to each of the plurality of reference items, distinguish the target item from the plurality of reference items when the target item corresponds to a first condition, configure a mixed color of the target item based on colors of the reference items, and, when the target item is a target item corresponding to a second condition, configure a color of the target item based on a color of the corresponding reference item related to the target item.

According to various embodiments, the target item corresponding to the first condition may include one or more items existing between the plurality of reference items and referenced by colors of the plurality of reference items, and the target item corresponding to the second condition may include one or more items contiguous only with one of the plurality of reference items and referenced by a color of the one reference item.

According to various embodiments, when the target item exists between a plurality of reference items but is referenced by a color of one reference item, the processor 120 may be configured to configure a color of the target item based on the color of the corresponding reference item, and when the target item exists between the plurality of reference items and is referenced by colors of the plurality of reference items, configure a mixed color of the target item based on colors of the plurality of reference items.

Hereinafter, an operation method according to various embodiments of the present disclosure will be described with reference to the accompanying drawings. However, since the various embodiments are not restricted or limited by the following description, it should be noted that applications can be made to the various embodiments based on embodiments that will be described below. Hereinafter, various embodiments of the present disclosure will be described based on an approach using hardware. However, various embodiments of the present disclosure include a technology that uses both hardware and software and thus, the various embodiments of the present disclosure may not exclude the adoption of software.

Figure 7:
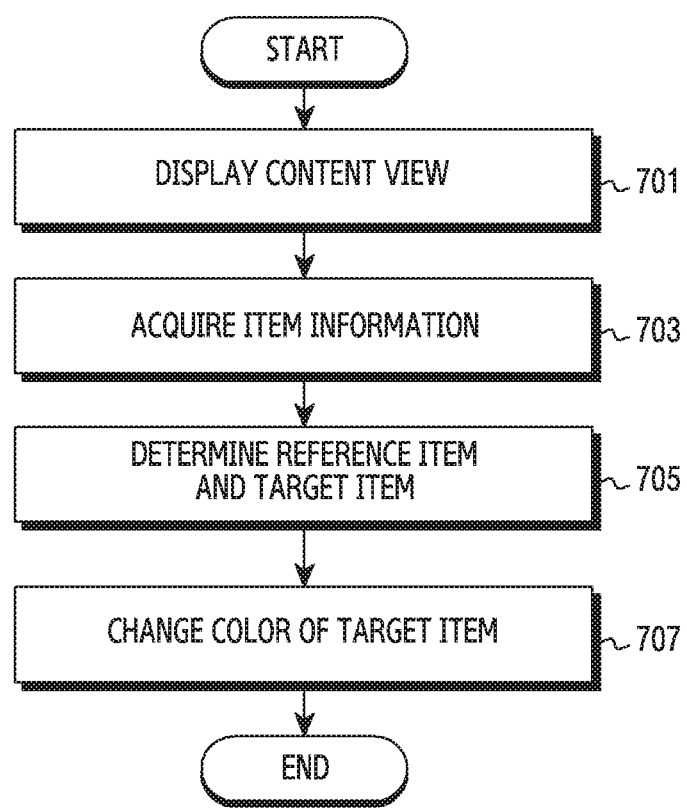
FIG. 7 is a flowchart illustrating a method of operating an electronic device according to various embodiments of the present disclosure.

FIG. 7 is a flowchart illustrating a method of operating the electronic device according to various embodiments of the present disclosure.

Referring to FIG. 7, in operation 701, the processor 120 (for example, one or more processors including processing circuitry) (or the function-processing module 300 of FIG. 3) of the electronic device 101 may display a content view. According to an embodiment, the processor 120 may process a display of the content view through the display device 160 (for example, the display 210) in response to detection of user input for displaying the content view.

In operation 703, the processor 120 may acquire item information (or content information). When user input for making a request for displaying the content view is detected, the processor 120 may identify an item corresponding to content displayed through the content view and acquire information related to the identified item. The processor 120 may extract information related to (associated with) the item provided to identify each piece of content in the content view displayed through the display device 160. According to an embodiment, the information related to the item may include information related to the existence or non-existence of representative information and/or a display state (for example, a loading state to be displayed) of the representative information.

According to an embodiment, the processor 120 may extract (for example, through a first extraction scheme) item information related to an item currently displayed through the display device 160 among content constituting the content view. According to an embodiment, the processor 120 may extract, at one time (for example, through a second extraction scheme), item information related to all items of content constituting the content view. According to various embodiments, the operation by the first extraction scheme and the second extraction scheme may be configured in advance according to the capability or specification of the electronic device 101, or may be selected and configured on the basis of settings of the electronic device 101 by the user.

In operation 705, the processor 120 may determine a reference item and a target item in the content view. The processor 120 may identify the item type (for example, the reference item or the target item) of the content view on the basis of the acquired item information. According to an embodiment, the processor 120 may distinguish the reference item and the target item on the basis of whether the item corresponding to content has representative information. According to various embodiments, one or more of reference items and one or more of target items may or may not be included in the content view. The reference item may include an item displayed on the basis of representative information in the content view. The target item may include an item to which corresponding (or relevant) representative information, which has been configured based on the representative information of the reference item, is applied in the content view.

In operation 707, the processor 120 may change a color of the target item. According to an embodiment, the processor 120 may extract a color on the basis of representative information of the determined reference item and change (or apply) the color of the target item on the basis of the extracted color. When the number of reference items is plural, the processor 120 may extract respective colors corresponding to a plurality of reference items. The processor 120 may configure the color of the target item on the basis of a color of at least one reference item adjacent (or next) to the corresponding target item or near (close to) the corresponding target item. The processor 120 may apply a color, which is the same as or associated with the color of the reference item, to the target item. The processor 120 may apply the color of the target item between two adjacent or nearby reference items (for example, a first reference item adjacent to an upper part of the target item and a second reference item adjacent to a lower part of the target item) on the basis of colors of the two reference items. According to various embodiments, a detailed screen example related to a change in the color of the target item will be described with reference to the following drawings.

According to an embodiment, when the reference item is not included in the content view, the processor 120 may change the color of the target item on the basis of a preset default color. According to an embodiment, the processor 120 may change colors of a plurality of target items on the basis of one reference color, change colors of a plurality of target item on the basis of at least two reference colors, or change each item on the basis of a plurality of reference colors corresponding to a plurality of items. According to an embodiment, when all items are reference items in the content view (or when there is no target item), the processor 120 may not perform an operation of changing the color of the target item since there is no target item.

Figure 8:
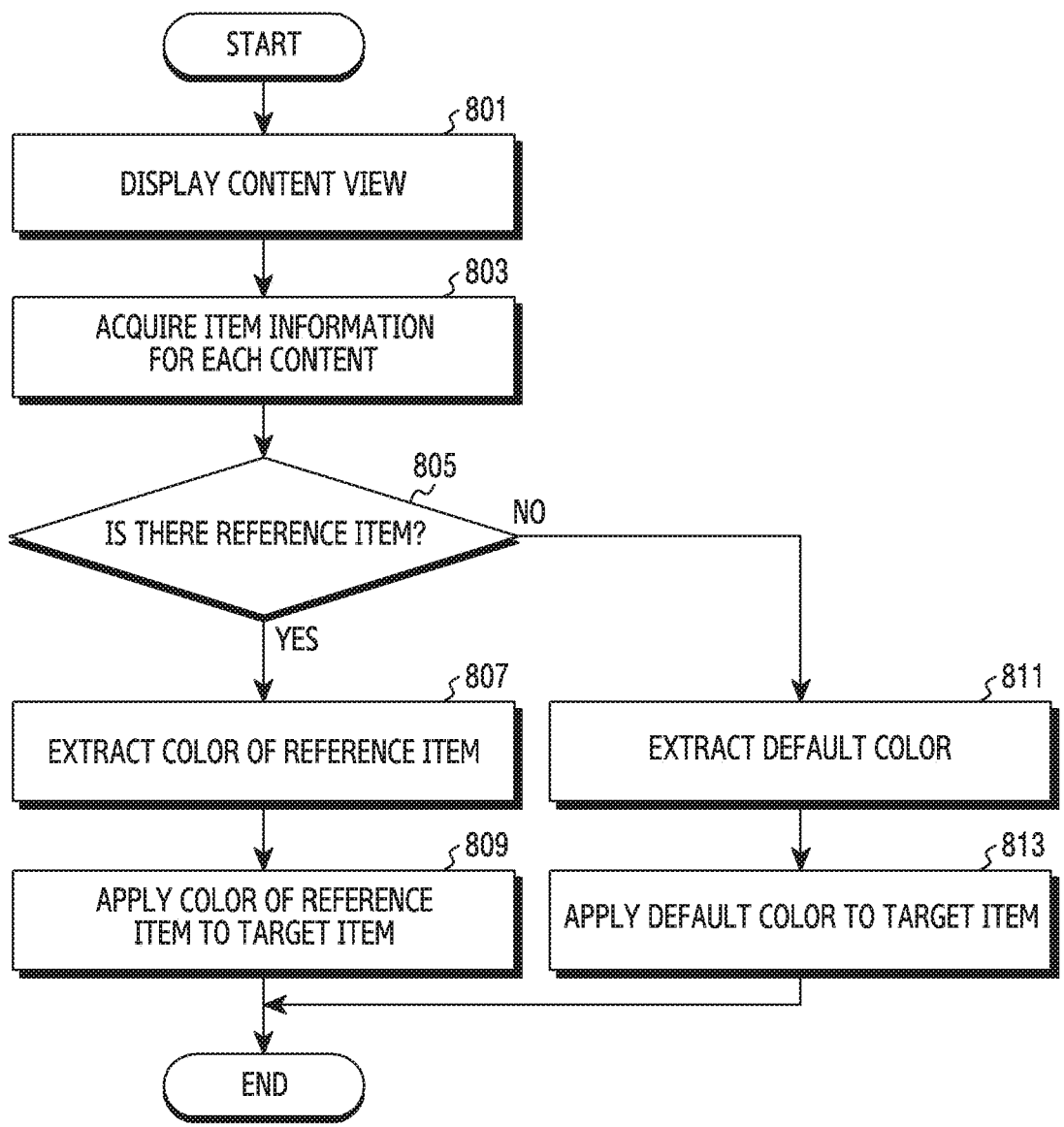
FIG. 8 is a flowchart illustrating a method of an operating an electronic device according to various embodiments of the present disclosure.

FIG. 8 is a flowchart illustrating a method of operating the electronic device according to various embodiments of the present disclosure.

Referring to FIG. 8, in operation 801, the processor 120 (or the function-processing module 300 of FIG. 3) of the electronic device 101 may display a content view. The processor 120 may process a display of the content view corresponding to a request for execution by the user on the basis of a configured array type.

In operation 803, the processor 120 may acquire item information for each piece of content. When the content view is displayed, the processor 120 may identify an item corresponding to content included in the content view and acquire information related to the identified item.

In operation 805, the processor 120 may determine whether the reference item exists (or is included) on the basis of the acquired item information. The processor 120 may determine whether the reference item is included in the content view on the basis of the item information. The reference item may be an item which has representative information, and may be displayed on the basis of the corresponding representative information in the content view.

When it is determined that the reference item exists (Yes in operation 805) based on the result of the determination in operation 805, the processor 120 may extract the color of the reference item in operation 807. The processor 120 may extract the color on the basis of representative information of the reference item. According to an embodiment, the processor 120 may extract a representative color of a representative image of the reference item. According to an embodiment, when the reference item is provided in the representative color without any image, the processor 120 may extract the representative color of the reference item. According to an embodiment, when the number of colors in the reference item is plural, the processor 120 may extract, as the representative color, a color having the highest occupancy rate among the plurality of colors.

In operation 809, the processor 120 may apply the color of the reference item to the target item. With respect to at least one target item in the vicinity of the reference item based on the reference item, the processor 120 may configure color-based representative information of the reference item. According to an embodiment, the processor 120 may change the color of at least one target item (for example, the target item(s) located on an upper part and/or a lower part of the reference item), which is adjacent to or neighbors the reference item.

According to an embodiment, the processor 120 may change the color of at least one target item (for example, other target item(s) adjacent to the target item(s) adjacent to the reference item) close to (or near) the reference item. According to an embodiment, the processor 120 may gradually (sequentially) change the color of the reference item (to be sequentially brighter or to be sequentially darker) and apply the changed color to a plurality of successive target items based on the reference item. According to an embodiment, the processor 120 may apply the color of the target item between two reference items (for example, a first reference item adjacent (close) to an upper part of the target item and a second reference item adjacent (close) to a lower part) to be balanced on the basis of colors of the two reference items.

When it is determined that there is no reference item (No in operation 805) based on the result of the determination in operation 805, the processor 120 may extract the default color in operation 811. When the reference item is not included in the content view, the processor 120 may be configured to extract a preset default color. The number of default colors may be configured to be one or more in the system (or the electronic device 101). The processor 120 may extract one or more default colors configured in the system (or the electronic device 101).

In operation 813, the processor 120 may apply the default color to the target item. The processor 120 may change the color of the target item on the basis of the preset default color. According to an embodiment, the processor 120 may gradually change colors of a plurality of target items on the basis of one reference color, gradually change colors of a plurality of target items on the basis of at least two reference colors, or gradually change colors of respective items on the basis of a plurality of reference colors corresponding to a plurality of items.

Figure 9:
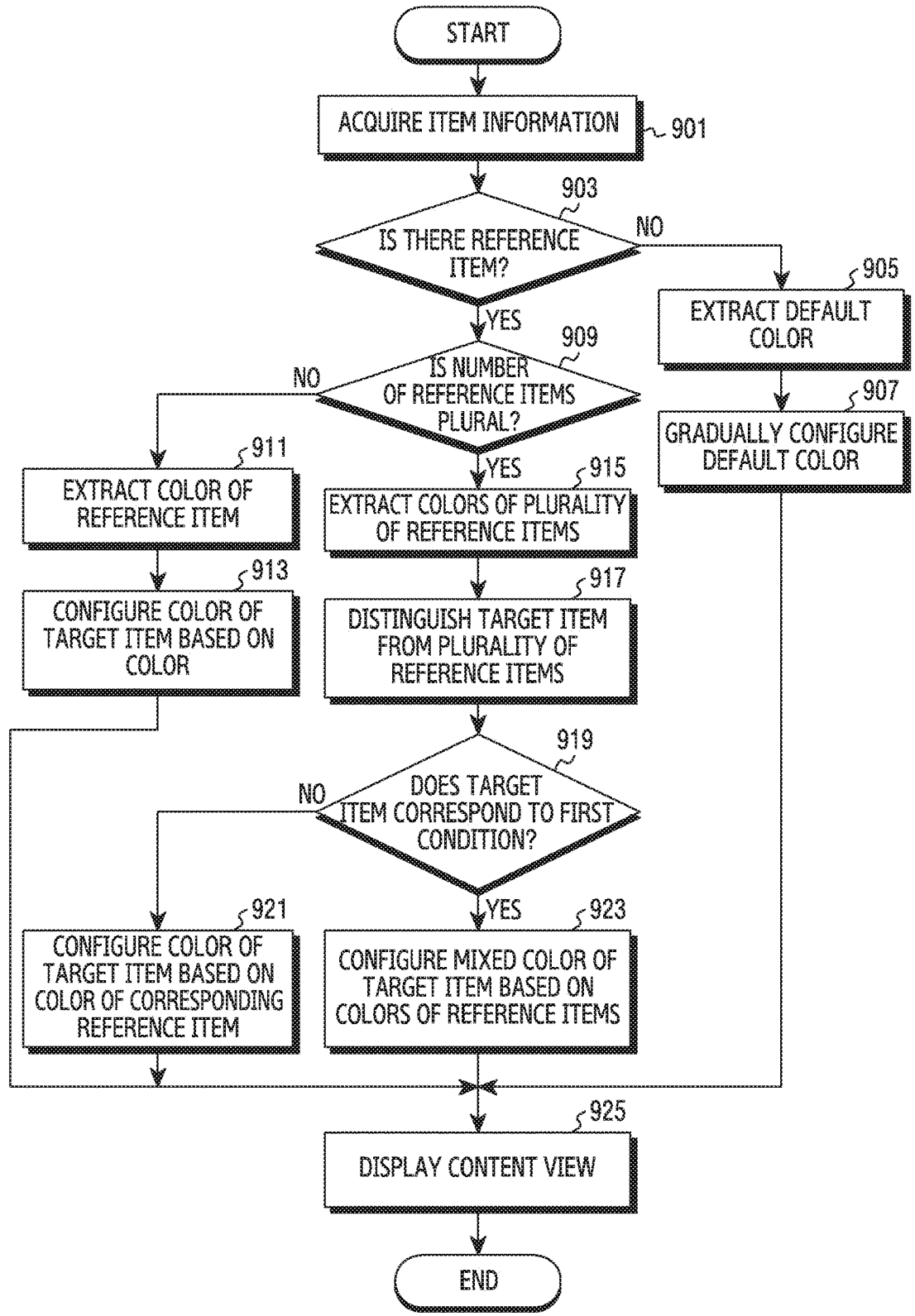
FIG. 9 is a flowchart illustrating a method of operating an electronic device according to various embodiments of the present disclosure.

FIG. 9 is a flowchart illustrating a method of operating the electronic device according to various embodiments of the present disclosure.

Referring to FIG. 9, in operation 901, the processor 120 (or the function-processing module 300 of FIG. 3) of the electronic device 101 may acquire item information. The processor 120 may identify an item included in a corresponding content view in response to detection of user input of making a request for executing the content view and acquire information related to the identified item.

In operation 903, the processor 120 may determine whether a reference item is included in the content view on the basis of the acquired item information. The processor 120 may distinguish a reference item and a target item within the content view on the basis of item information. The reference item may be an item displayed in the content view based on representative information. The target item may include an item to which corresponding (or relevant) representative information, which has been configured based on the representative information of the reference item, is applied in the content view.

When it is determined that there is no reference item (No in operation 903) based on the result of the determination in operation 903, the processor 120 may extract the default color in operation 905. When the reference item is not included in the content view, the processor 120 may be configured to extract a preset default color.

In operation 907, the processor 120 may gradually configure default colors in the target item. According to an embodiment, the processor 120 may change the color of the target item on the basis of one or more preset default colors. According to an embodiment, the processor 120 may select a particular target item (for example, an uppermost item, a lowermost item, or a middle item) according to a configured type in the content view and gradually apply the default color to all target items based on the selected target item. According to an embodiment, the processor 120 may gradually change and apply the default color (to be sequentially brighter or to be sequentially darker) in a downward direction based on the uppermost item. According to an embodiment, the processor 120 may gradually change and apply the default color in an upward direction or a downward direction based on the middle item.

When it is determined that there is a reference item (Yes in operation 903) based on the result of the determination in operation 903, it may be determined whether the number of reference items is plural in operation 909.

When it is determined that the number of reference items is not plural (No in operation 909) based on the result of operation 909, or when it is determined that the number of reference items is singular, the processor 120 may extract the color of the corresponding reference item in operation 911. The processor 120 may extract the color on the basis of representative information of the reference item. According to an embodiment, the processor 120 may extract a representative color of a representative image of the reference item. According to an embodiment, when the reference item is provided in the representative color without any image, the processor 120 may extract the representative color of the reference item.

In operation 913, the processor 120 may configure the color of the target item on the basis of the extracted color. The processor 120 may configure color-based representative information of the reference item with respect to at least one target item from a target item adjacent to the reference item to a target item near the reference item based on the reference item. According to an embodiment, the processor 120 may gradually change (to be sequentially brighter or darker) and apply the color extracted from at least one target item up to the last target item close to the reference item in a corresponding direction from the at least one target item adjacent to the reference item (for example, target item(s) located on an upper part and/or a lower part of the reference item).

When it is determined that the number of reference items is plural (Yes in operation 909) based on the result of the determination in operation 909, the processor 120 may extract the color corresponding to each of the plurality of reference items. According to an embodiment, when the number of reference items is two, the processor 120 may extract two colors (for example, a first color of the first reference item and a second color of the second reference item) corresponding to the two reference items (for example, the first reference item and the second reference item).

In operation 917, the processor 120 may distinguish the target item from a plurality of reference items. For example, the processor 120 may distinguish the target item corresponding to a first condition and the target item corresponding to a second condition. According to an embodiment, the target item corresponding to the first condition may include one or more items that exist between the plurality of reference items (for example, the first reference item and the second reference item) and are referenced by colors of the plurality of reference items. According to an embodiment, the target item corresponding to the second condition may include one or more items that are contiguous only with one of the plurality of reference items and are referenced by the color of one reference item.

In operation 919, the processor 120 may determine whether the target item to configure representative information is included in the target item of the first condition or in the target item of the second condition.

When it is determined that the target item is not the target item of the first condition (No in operation 919) based on the result of the determination in operation 919 (or when it is determined that the target item is the target item of the second condition), the processor 120 may configure the color of the target item on the basis of the color of the corresponding reference item in operation 921. According to an embodiment, the processor 120 may configure the color of the target item on the basis of the color of the reference item corresponding to the target item among the plurality of reference items. With reference to at least one target item from the target item adjacent to the reference item to the target item near the reference item, the processor 120 may configure color-based representative information of the reference item based on the corresponding reference item.

When it is determined that the target item is the target item of the first condition (Yes in operation 919) based on the result of the determination in operation 919, the processor 120 may apply a mixed color of the target item on the basis of colors of the reference items in operation 923. According to an embodiment, the processor 120 may mix and apply colors according to a configured scheme such that the colors of the target item are harmonized (for example, color-balanced) on the basis of the colors of the two reference items (for example, a first color of the first reference item adjacent to the upper part of the target item and a second color of the second reference item adjacent to the lower part of the target item).

According to an embodiment, the processor 120 may apply the colors such that a color 1-1 derived from (associated with) the first color of the first reference item and a color 2-1 derived from (associated with) the second color of the second reference item occupy the same ratio (or same area) of the target item.

According to an embodiment, when the number of target items corresponding to the first condition (for example, when a plurality of target items exists between the first reference item on the upper part and the second reference item on the lower part), the processor 120 may gradually change and apply the colors of the target items in two directions based on the first reference item and the second reference item (for example, a downward direction from the first reference item and an upward direction from the second reference item).

According to an embodiment, the processor 120 may gradually change and apply the color of the target items on the basis of the color (for example, the color 1-1 or the color 1-2) derived from the first color in the downward direction from the first reference item on the upper part. According to an embodiment, the processor 120 may gradually change and apply the colors of the target items on the basis of the color (for example, the color 2-1 or the color 2-2) derived from the second color in the upward direction from the second reference item on the lower part. According to an embodiment, in the case of the target item located in the middle of the target items between the first reference item and the second reference item, the processor 120 may apply the colors such that a color (for example, a color 1-N) gradually derived from the first color of the first reference item and a color (for example, a color 2-N) gradually derived from the second color of the second reference item occupy the same ratio (or same area) of the target item.

In operation 925, the processor 120 may display the content view in which the default color is applied to the target item according to the performance of operation 907, operation 913, operation 921, and operation 923 through the display device 160.

Hereinafter, FIGS. 10, 11, 12, 13, and 14 illustrate screen examples of configuring and providing color-based representative information for a target item having no representative information on the basis of a color of a reference item having representative information according to various embodiments. In FIGS. 10, 11, 12, 13, and 14, an example in which item colors may be divided and expressed using a difference in hatching intervals (or a difference in density of shadow) based on lines (for example, a full line (for example, a horizontal line, a vertical line, a diagonal line, or a radial line) and a dotted line) or dots.

Figure 10:
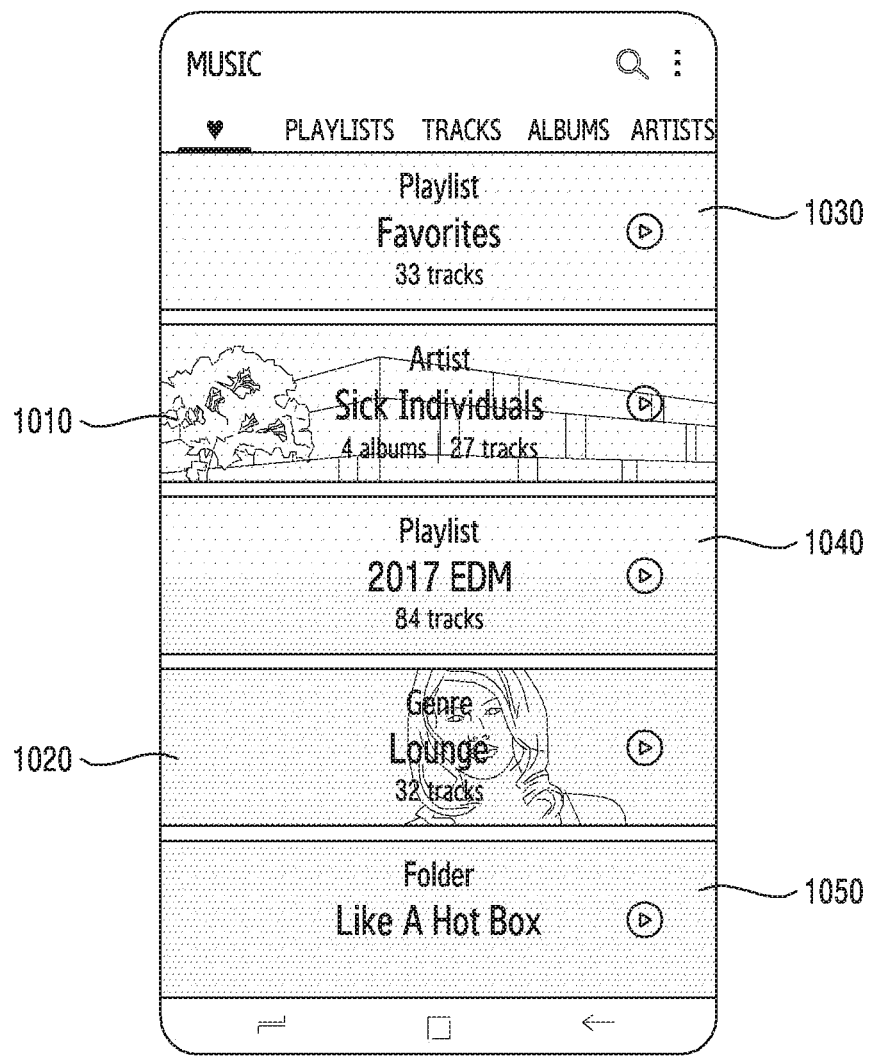
FIGS. 10 to 14 illustrate examples of a user interface provided by an electronic device according to various embodiments of the present disclosure.

FIG. 10 illustrates an example of a user interface provided by the electronic device according to various embodiments of the present disclosure.

Referring to FIG. 10, elements 1010 and 1020 indicate reference items (for example, a first reference item 1010 and a second reference item 1020) and elements 1030, 1040, and 1050 indicate target items (for example, a first target item 1030, a second target item 1040, and a third target item 1050) in FIG. 10. According to an embodiment, FIG. 10 illustrates an example in which colors of the target items 1030, 1040, and 1050, which are not adjacent to each other (or which are not successive) are configured on the basis of the first reference item 1010 and the second reference item 1020. According to an embodiment, FIG. 10 may show an example in which the reference items 1010 and 1020 provide representative information on the basis of a representative image having at least one color.

In the first target item 1030 adjacent to the first reference item 1010, representative information may be configured on the basis of a color derived from a first color of the first reference item 1010 (for example, the first color (for example, a primary color)) or a color having a color code at least one level lower than a color code of the first color (for example, a color having a brightness one level lower).

In the second target item 1040 adjacent to the first reference item 1010 and the second reference item 1020 between the first reference item 1010 and the second reference item 1020, representative information may be configured on the basis of a mixed color of the color derived from the first color of the first reference item 1010 and a color derived from a second color of the second reference item (for example, the second color (for example, the primary color) or a color having a color code at least one level lower than a color code of the second color). According to an embodiment, the second target item 1040 may be configured and provided such that the second target item 1040 is split based on the center thereof to have the same area and such that two colors associated with the first color and the second color are balanced.

In the third target item 1050 adjacent to the second reference item 1020, representative information may be configured on the basis of the color derived from the second color of the second reference item 1020.

Figure 11:
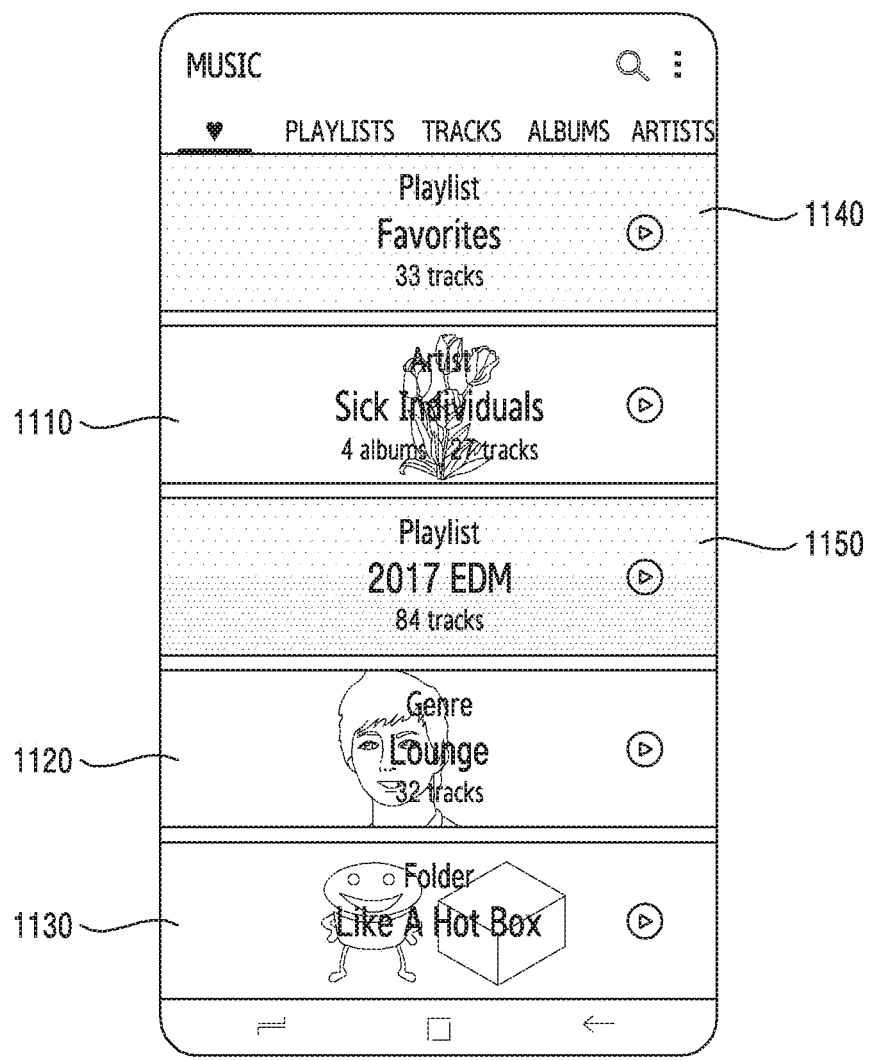

FIG. 11 illustrates an example of a user interface provided by the electronic device according to various embodiments of the present disclosure.

Referring to FIG. 11, elements 1110, 1120, and 1130 indicate reference items (for example, a first reference item 1110, a second reference item 1120, and a third reference item 1130) and elements 1140 and 1150 indicate target items (for example, a first target item 1140 and a second target item 1150) in FIG. 11. According to an embodiment, FIG. 11 illustrates an example in which colors of target items 1140 and 1150, which are not adjacent to each other (or are not successive), are configured on the basis of the first reference item 1110 and the second reference item 1120.

In the first target item 1140 adjacent to the first reference item 1110, representative information may be configured on the basis of a color derived from a first color of the first reference item 1110 (for example, the first color (for example, the primary color) or a color having a color code at least one level lower than a color code of the first color (for example, a color having a brightness one level lower)).

In the second target item 1150 adjacent to the first reference item 1110 and the second reference item 1120 between the first reference item 1110 and the second reference item 1120, representative information may be configured on the basis of a mixed color of the color derived from the first color of the first reference item 1010 and a color derived from a second color of the second reference item (for example, the second color (for example, the primary color) or a color having a color code at least one level lower than a color code of the second color). According to an embodiment, the second target item 1150 may be configured and provided such that the second target item 1150 is split based on the center thereof to have the same area and such that two colors associated with the first color and the second color are balanced.

According to an embodiment, the third reference item 1130 does not have a target item which is adjacent thereto or is influenced thereby. Accordingly, a third color of the third reference item 1130 may not be applied to the target item. However, although not illustrated, when at least one target item exists on a lower part of the third reference item 1130, representative information of the corresponding target item may be configured by gradually changing a color associated with the color of the third reference item 1130 and applying the gradually changed color to the corresponding target item.

Figure 12:
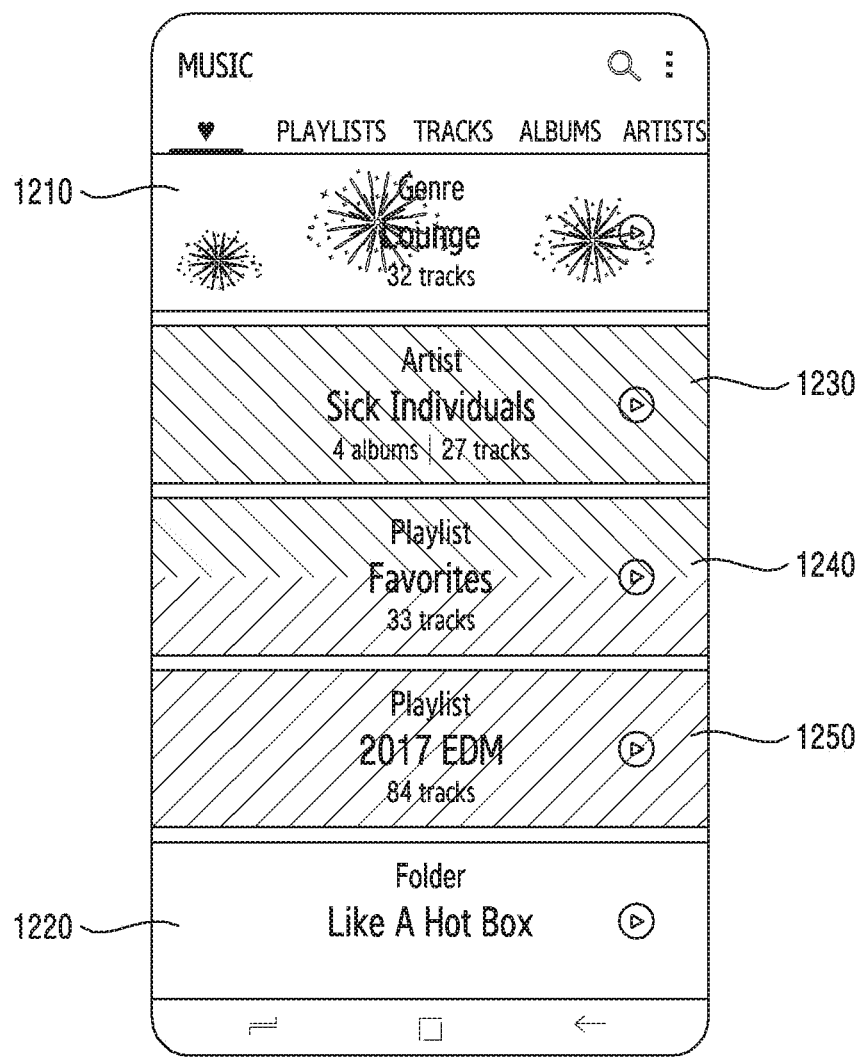

FIG. 12 illustrates an example of a user interface provided by the electronic device according to various embodiments of the present disclosure.

Referring to FIG. 12, elements 1210 and 1220 indicate reference items (for example, a first reference item 1210 and a second reference item 1220) and elements 1230, 1240, and 1250 indicate target items (for example, a first target item 1230, a second target item 1240, and a third target item 1250) in FIG. 12. According to an embodiment, FIG. 12 illustrates an example in which colors of the target items 1230, 1240, and 1250, which are adjacent to each other (or which are successive) on the basis of the first reference item 1210 and the second reference item 1220.

In the first target item 1230 adjacent to the first reference item 1210, representative information may be configured on the basis of a color derived from a first color of the first reference item 1210 (for example, the first color (for example, the primary color) or a color having a color code at least one level lower than a color code of the first color (for example, a color having a brightness one level lower)).

In the third target item 1250 adjacent to the second reference item 1220, representative information may be configured on the basis of a color derived from a second color of the second reference item 1220 (for example, the second color (for example, the primary color) or a color having a color code at least one level lower than a color code of the second color (for example, a color having a brightness one level lower)).

In the second target item 1240 near the first reference item 1210 and the second reference item 1220 between the first reference item 1210 and the second reference item 1220 (for example, the second target item 1240 adjacent to the first target item 1230 and the third target item 1250), representative information may be configured on the basis of a mixed color of a color derived from a first color of the first reference item 1210 (for example, a color having a color code at least two levels lower than a color code of the first color or a color having a color code at least one level lower than a color code applied to the first target item 1230) and a color derived from a second color (for example, a color having a color code at least two levels lower than a color code of the second color or a color having a color code at least one level lower than a color code applied to the third target item 1250). According to an embodiment, the second target item 1240 may be configured and provided such that the second target item 1240 is split based on the center thereof to have the same area and such that two colors associated with the first color and the second color are balanced.

As illustrated in FIG. 12, the colors may be gradually and sequentially applied to the first target item 1230 to the third target item 1250 located between the first reference item 1210 and the second reference item 1220 on the basis of different types of colors (for example, the color of the first reference item 1210 and the color of the second reference item 1220) acquired between the first reference item 1210 and the second reference item 1220.

Figure 13:
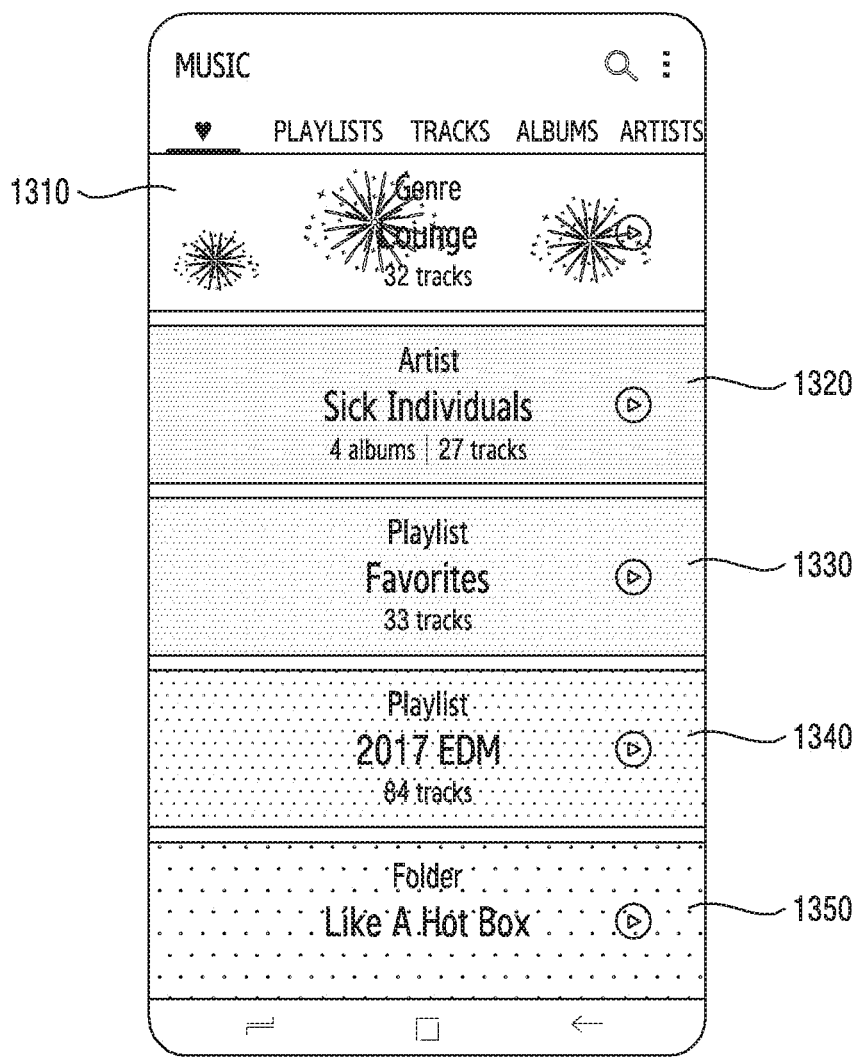

FIG. 13 illustrates an example of a user interface provided by the electronic device according to various embodiments of the present disclosure.

Referring to FIG. 13, an element 1310 may indicate a reference item and elements 1320, 1330, 1340, and 1350 may indicate target items (for example, a first target item 1320, a second target item 1330, a third target item 1340, and a fourth target item 1350) in FIG. 13. According to an embodiment, FIG. 13 illustrates an example in which the number of reference items 1310 is one and colors of the target items 1320, 1330, 1340, and 1350 that are adjacent to each other (or which are successive) are configured on the basis of the reference item 1310.

In the first target item 1320 adjacent to the first reference item 1310, representative information may be configured on the basis of a color 1-1 derived from a first color of the first reference item 1310 (for example, the first color (for example, the primary color) or a color having a color code at least one level lower than a color code of the first color).

In the second target item 1330 (for example, adjacent to the first target item 1320) near the first reference item 1310, representative information may be configured on the basis of a color 1-2 derived from the first color of the first reference item 1310 (for example, a color having a color code at least two levels lower than the color code of the first color (or a color having a color code at least one level lower than a color code of a color applied to the first target item 1320)).

As described above, in the third target item 1340, representative information may be configured on the basis of a color having a color code at least one level lower than a color code of a color applied to the second target item 1330, and in the fourth target item 1350, information may be configured on the basis of a color having a color code at least one level lower than a color code of a color applied to the third target item 1340.

As illustrated in FIG. 13, gradual colors acquired on the basis of the color of the reference item 1310 (for example, the uppermost reference item in the content view) having representative information may be sequentially applied to the items from the first target item 1320 to the second target item 1350.

Figure 14:
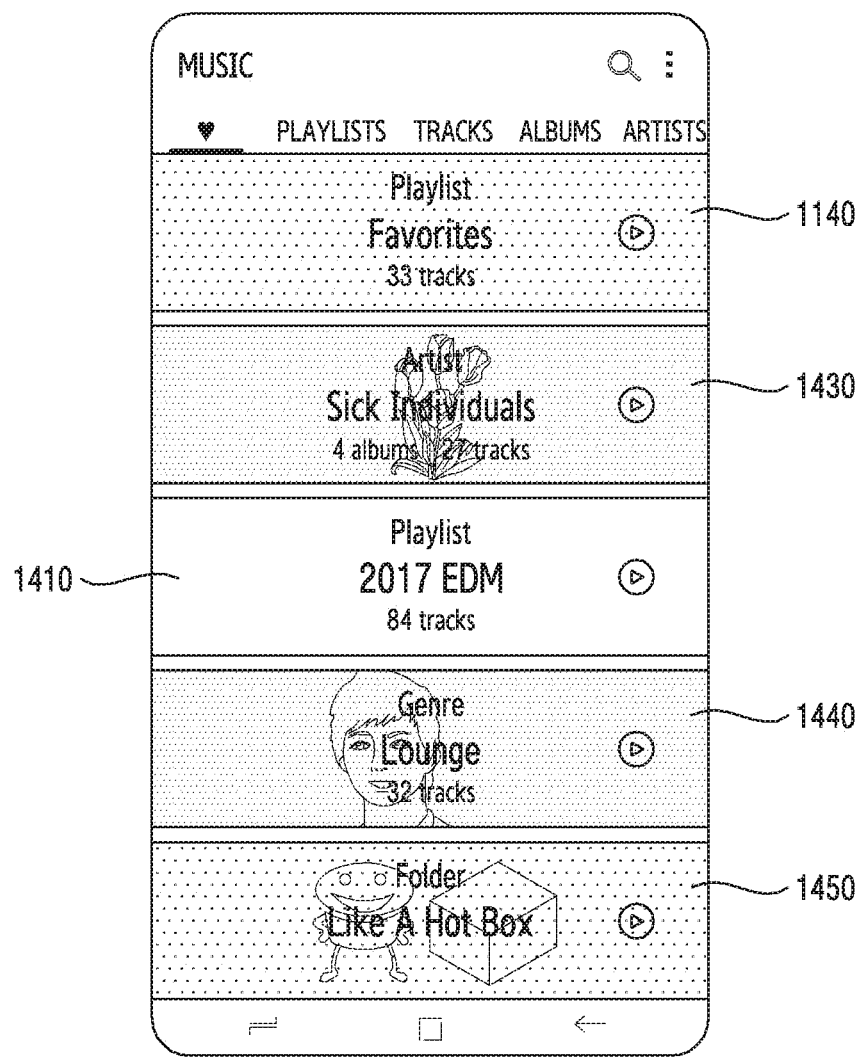

FIG. 14 illustrates an example of a user interface provided by the electronic device according to various embodiments of the present disclosure.

Referring to FIG. 14, an element 1410 indicates a reference item and elements 1420, 1430, 1440, and 1450 indicate target items (for example, a first target item 1420, a second target item 1430, a third target item 1440, and a fourth target item 1450) in FIG. 14. According to an embodiment, FIG. 14 illustrates an example in which the number of reference item 1410 is one and colors of the target items 1420, 1430, 1440, and 1450 which are adjacent to each other (or which are successive) are configured on the basis of the reference item 1410.

In the second target item 1430 and the third target item 1440 adjacent to the first reference item 1410, representative information may be configured on the basis of a color 1-1 derived from a first color of the first reference item 1410 (for example, the first color (for example, the primary color) or a color having a color code at least one level lower than a color code of the first color).

In the target items 1420 and 1450 (for example, the first target item 1420 adjacent to the second target item 1430 and the fourth target item 1450 adjacent to the third target item 1440) near the first reference item 1410, representative information may be configured on the basis of a color 1-2 derived from the first color of the first reference item 1410 (for example, a color having a color code at least two levels lower than the color code of the first color (or a color having a color code at least one level lower than a color code applied to the third target item 1440)).

According to an embodiment, the colors applied to the second target item 1430 and the third target item 1440 adjacent to the first reference item 1410 may be colors of the same level (or color code) based on the color of the first reference item 1410. According to an embodiment, the colors applied to the first target item 1420 and the fourth target item 1450 near the first reference item 1410 may be colors of the same level (or color code) based on the color of the first reference item 1410.

As described above, according to various embodiments, with respect to content having no representative information (for example, representative image), representative information (for example, a color-based representative image) may be configured on the basis of the reference item having representative information. Accordingly, it is possible to improve aesthetics between items in the content view according to various embodiments. According to an embodiment, in order to guarantee aesthetics of a target item having no representative information, it is possible to extract a color (for example, the primary color) of a representative image of the reference item (for example, the reference item on an upper/lower part of the target item) adjacent to/near the current location of the target item and gradually apply the extracted color.

Figure 15:
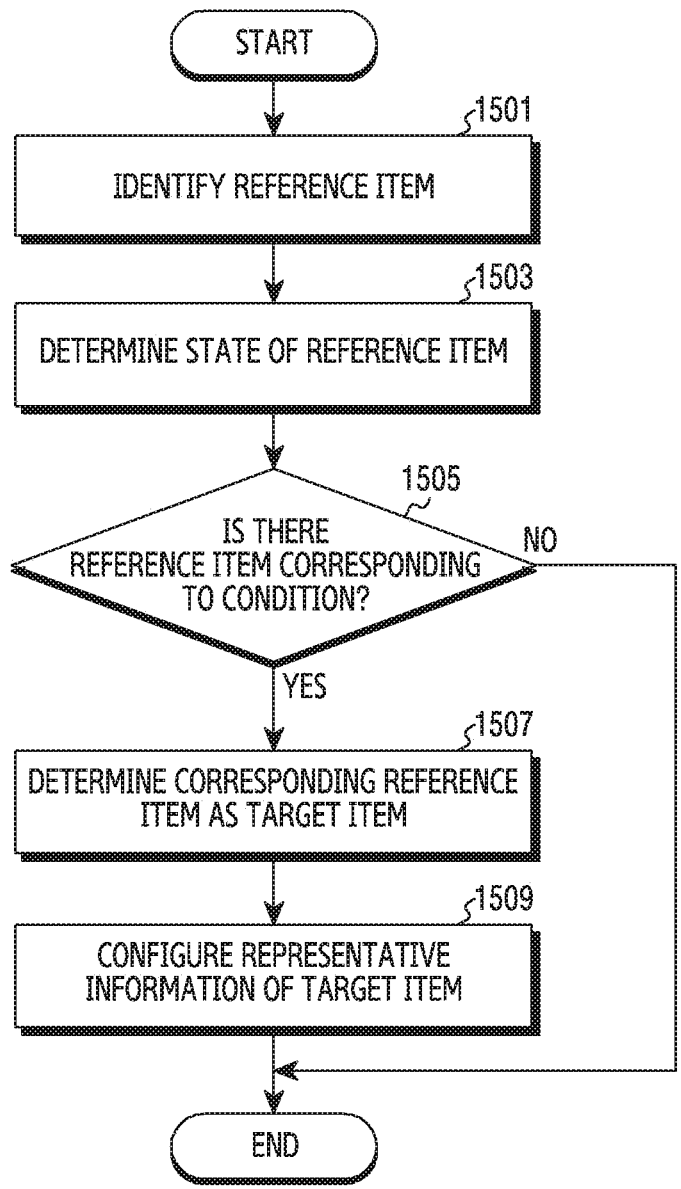
FIG. 15 is a flowchart illustrating a method of operating an electronic device according to various embodiments of the present disclosure.

FIG. 15 is a flowchart illustrating a method of operating the electronic device according to various embodiments of the present disclosure.

Referring to FIG. 15, in operation 1501, the processor 120 (or the function-processing module 300 of FIG. 3) of the electronic device 101 may identify a reference item. According to an embodiment, the processor 120 may distinguish (determine) a reference item and a target item in a content view.

In operation 1503, the processor 120 may determine a state of the reference item. According to an embodiment, the processor 120 may determine a display state indicating whether or not representative information of the reference item has been applied to the reference item.

In operation 1505, the processor 120 may determine whether there is a reference item corresponding to a condition. The processor 120 may determine whether there is a reference item of a configured condition in a content view based on the result of the determination in operation 1503. According to an embodiment, the processor 120 may determine whether there is a reference item in a state before representative information is actually applied to the item and displayed because the representative information of the reference item is being loaded or content is being downloaded from the outside (for example, another electronic device or a server).

When it is determined that there is no reference item corresponding to the condition (No in operation 1505) based on the result of the determination in operation 1505, the processor 120 may end the operation of FIG. 15 of determining the target item for the reference item.

When it is determined that there is a reference item corresponding to the condition (Yes in operation 1505) based on the result of the determination in operation 1505, the processor 120 may determine (include) the reference item corresponding to the condition as the target item. According to an embodiment, the processor 120 may further include the corresponding reference item in a predetermined target item as a target item for constituting a color-based representative image.

In operation 1509, the processor 120 may configure representative information of the target item. According to an embodiment, the processor 120 may process an operation of applying a color of the target item on the basis of a color of the reference item displayed on the basis of the representative information as described above.

Figure 16:
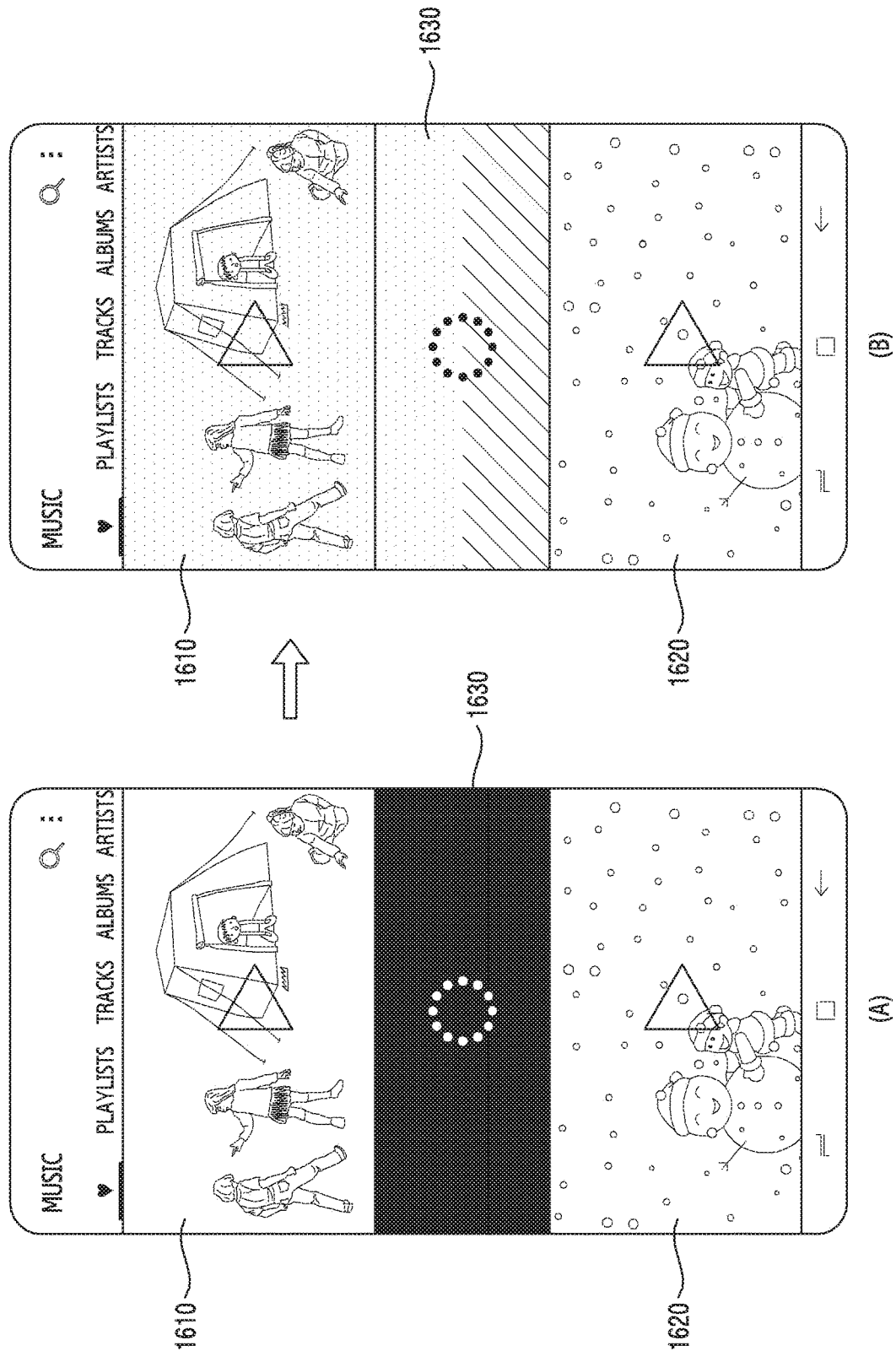
FIG. 16 illustrate an example of a user interface provided by an electronic device according to various embodiments of the present disclosure.

FIG. 16 illustrate an example of a user interface provided by the electronic device according to various embodiments of the present disclosure.

Referring to FIG. 16, elements 1610 and 1620 indicate reference items (for example, a first reference item 1610 and a second reference item 1620) and an element 1630 indicates the target item in FIG. 16. FIG. 16 shows an example in which the target item 1630 exists between the first reference item 1610 and the second reference item 1620.

In FIG. 16, the target item 1630 is a reference item having actual representative information, but the target item 1630 may be an item to which representative information has not been applied, as illustrated in FIG. 16(A). According to an embodiment, an item having representative information but to which the representative information has not been applied may include a state before the representative information is actually applied to the item and displayed, for example, because the representative information is being loaded or content is being downloaded from the outside (for example, another electronic device or a server).

According to various embodiments, when the actual reference item is not displayed based on representative information as illustrated in FIG. 16(A), the content view may be provided without representative information (for example, with a blank). According to various embodiments, with respect to a reference item which has representative information but is not (or cannot be) expressed by representative information, it is possible to configure and provide a color-based representative image on the basis of a color of another reference item by including the reference item in the target item.

As illustrated in FIG. 16(B), in the target item 1630 between the first reference item 1610 and the second reference item 1620, representative information may be configured on the basis of a mixed color of a color derived from a first color of the first reference item 1610 and a color derived from a second color of the second reference item 1620. According to an embodiment, the representative information configured in the target item 1630 may be virtual representative information, and the target item 1630 may include actual representative information which can serve as the reference item.

Figure 17:
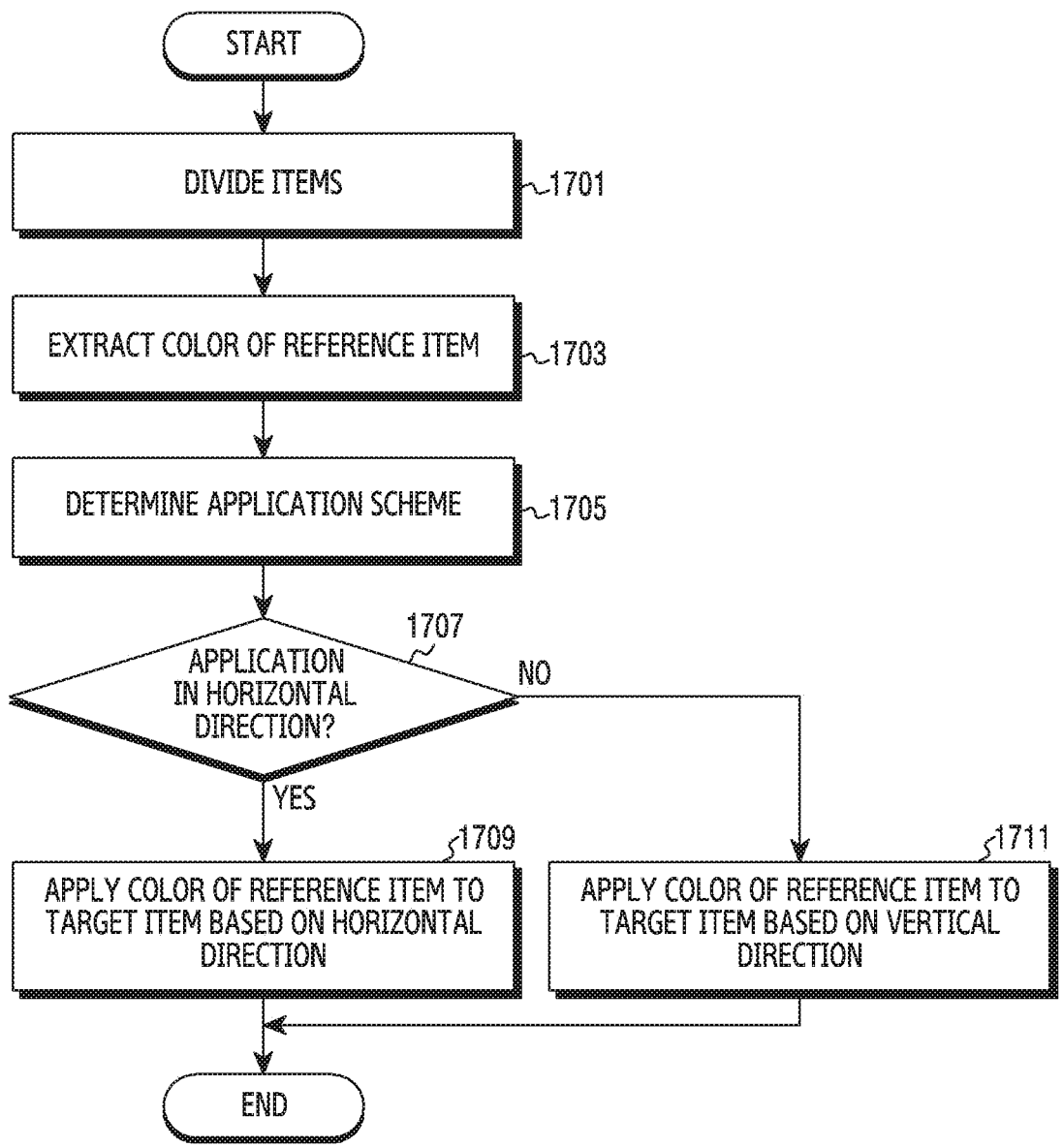
FIG. 17 is a flowchart illustrating a method of operating an electronic device according to various embodiments of the present disclosure.

FIG. 17 is a flowchart illustrating a method of operating the electronic device according to various embodiments of the present disclosure.

Referring to FIG. 17, in operation 1701, the processor 120 (or the function-processing module 300 of FIG. 3) of the electronic device 101 may distinguish items. According to an embodiment, the processor 120 may distinguish (determine) a reference item and a target item in a content view.

In operation 1703, the processor 120 may extract a color of the reference item on the basis of the reference item. According to an embodiment, the processor 120 may extract the corresponding color (for example, a primary color) on the basis of representative information of the reference item.

In operation 1705, the processor 120 may determine a preset application scheme for application of the color of the reference item. According to an embodiment, when displaying a content view, the processor 120 may further include an operation of determining a display type of the content view and determining a configured application scheme (for example, a target item color application scheme) according to the display type. According to an embodiment, in connection with the configuration of the color-based representative image for the target item, a scheme of applying the color based on the reference item (for example, a direction or a pattern) may be preset. According to an embodiment, the application scheme may be configured so as to apply the color of the reference item in a width (or horizontal) direction, a length (or vertical) direction, or omnidirectionally (for example, horizontal, vertical, and diagonal directions). FIG. 17 illustrates an example in which one of the width (or horizontal) direction and the length (or vertical) direction is set as the color application scheme.

In operation 1707, the processor 120 may determine whether the application scheme is a horizontal application scheme or a vertical application scheme based on the result of the determination in operation 1705.

When it is determined that the application scheme is a horizontal application scheme (Yes in operation 1707) based on the result of the determination in operation 1705, the processor 120 may apply the color of the reference item to the target item based on the horizontal direction in operation 1709. According to an embodiment, the processor 120 may be configured to gradually apply the color of the reference item to the target item in at least one direction corresponding to the location of the target item among left and right vertical directions based on the reference item.

When it is determined that the application scheme is a vertical application scheme (No in operation 1707) based on the result of the determination in operation 1705, the processor 120 may apply the color of the reference item to the target item based on the vertical direction in operation 1711. According to an embodiment, the processor 120 may be configured to gradually apply the color of the reference item to the target item in at least one direction corresponding to the target item among upward and downward vertical directions based on the reference item.

Figure 18:
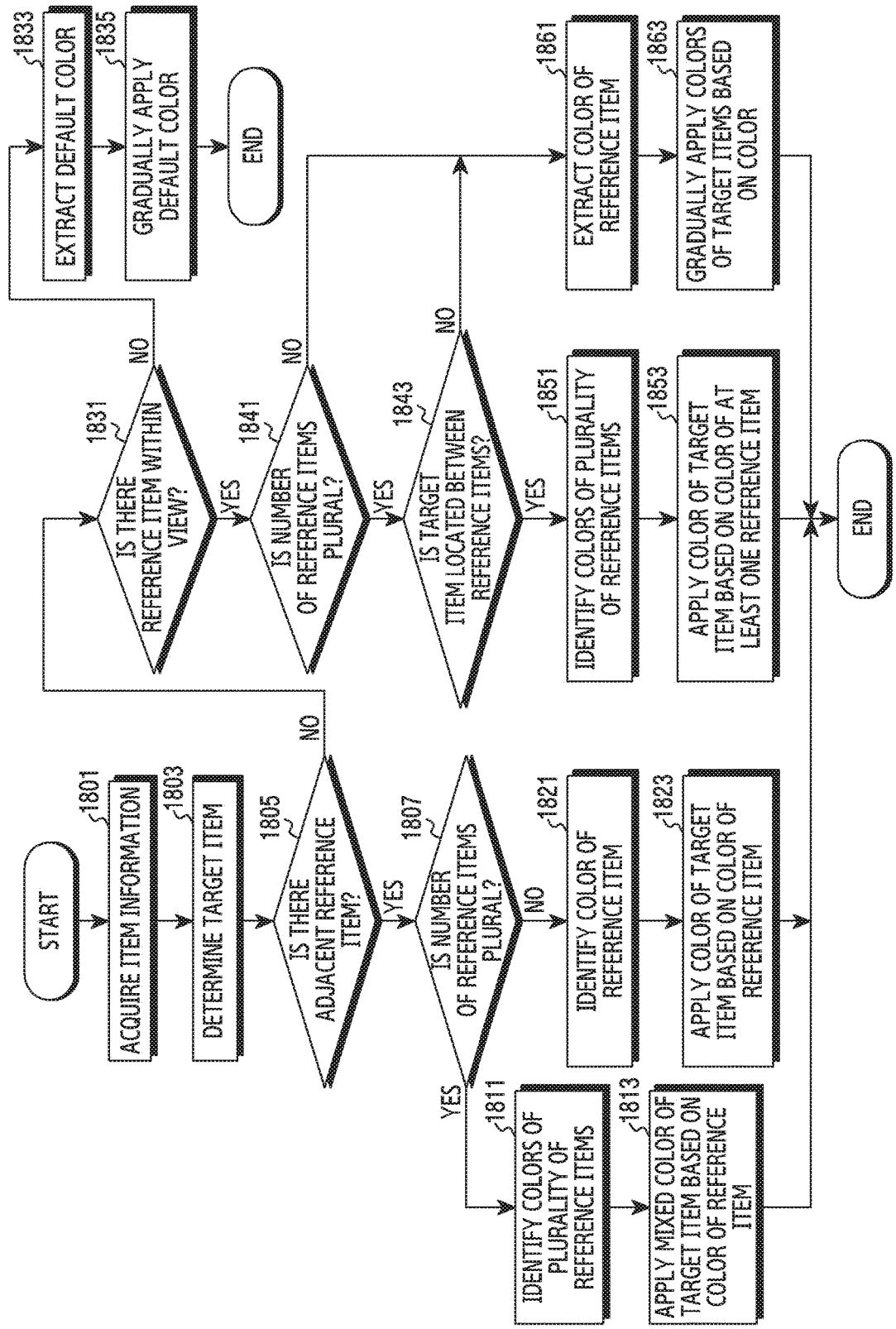
FIG. 18 is a flowchart illustrating a method of operating an electronic device according to various embodiments of the present disclosure.

FIG. 18 is a flowchart illustrating a method of operating the electronic device according to various embodiments of the present disclosure.

According to various embodiments, FIG. 18 illustrates an example of an operation of applying a color of a target item based on the target item.

Referring to FIG. 18, in operation 1801, the processor 120 (or the function-processing module 300 of FIG. 3) of the electronic device 101 may acquire item information. The processor 120 may identify an item included in a corresponding content view in response to detection of user input of making a request for executing the content view and acquire information related to the identified item.

In operation 1803, the processor 120 may determine a target item on the basis of the acquired item information. The processor 120 may distinguish a reference item and a target item within the content view on the basis of item information. The reference item may be an item displayed in the content view based on representative information. The target item may include an item to which corresponding (or relevant) representative information, which has been configured based on the representative information of the reference item, is applied in the content view.

In operation 1805, the processor 120 may determine whether there is a reference item adjacent to the target item. According to an embodiment, the processor 120 may determine whether there is a reference item with representative information displayed at a location adjacent to the target item (for example, a location adjacent to at least one side of an upper part, a lower part, a left part, and a right part of the target item).

When it is determined that there is a reference item adjacent to the target item (Yes in operation 1805) based on the result of the determination in operation 1805, the processor 120 may proceed to operation 1807 and perform operation 1807 and subsequent operations. When it is determined that there is no reference item adjacent to the target item (No in operation 1805) based on the result of operation 1805, the processor 120 may proceed to operation 1831 and perform operation 1831 and subsequent operations.

The processor 120 may determine whether the number of reference items adjacent to the target item is plural in operation 1807. According to an embodiment, the target item may be adjacent to an upper part, a lower part, a left part, or a right part of the reference item, or may be adjacent to at least two parts (for example, the upper part and the lower part) of the upper part, the lower part, the left part, and the right part of the reference item.

When it is determined that the number of reference items is plural (Yes in operation 1807) based on the result of the determination in operation 1807, the processor 120 may determine (identify) respective colors corresponding to the plurality of reference items in operation 1811. According to an embodiment, when the number of reference items is two, the processor 120 may extract two colors (for example, a first color of the first reference item and a second color of the second reference item) corresponding to the two reference items (for example, the first reference item and the second reference item).

In operation 1813, the processor 120 may apply a mixed color of the target item based on colors of the reference items. According to an embodiment, the target item may be a target item corresponding to a first condition as described above. The target item corresponding to the first condition may be an item which exists between the plurality of reference items (for example, a first reference item and a second reference item) and is referenced by the plurality of reference items. According to an embodiment, the processor 120 may mix and apply colors according to a configured scheme such that the colors of the target item are harmonized (for example, color-balanced) on the basis of the colors of the two reference items (for example, a first color of the first reference item adjacent to the upper part of the target item and a second color of the second reference item adjacent to the lower part of the target item). According to an embodiment, the processor 120 may apply the colors such that a color 1-1 derived from (associated with) the first color of the first reference item and a color 2-1 derived from (associated with) the second color of the second reference item occupy the same proportion (or same area) of the target item.

When it is determined that the number of adjacent reference items is not plural (No in operation 1807) (or when it is determined that the number of adjacent reference items is one) based on the result of the determination in operation 1807, the processor 120 may determine (identify) the color corresponding to the reference item in operation 1821. The processor 120 may extract the color on the basis of representative information of the reference item. According to an embodiment, the processor 120 may extract a representative color of a representative image of the reference item. According to an embodiment, when the reference item is provided in the representative color without any image, the processor 120 may extract the representative color of the reference item.

In operation 1823, the processor 120 may apply the color of the target item on the basis of the color of the reference item. According to an embodiment, the target item may be a target item corresponding to a second condition as described above. The target item corresponding to the second condition may be an item which is contiguous only with one reference item and referenced by the color of the one reference item. According to an embodiment, the processor 120 may configure the color of the target item on the basis of the color of the reference item corresponding to the target item. Based on the corresponding reference item, the processor 120 may configure color-based representative information of the reference item with respect to at least one target item from the target item adjacent to the reference item to the target item near the reference item In operation 1831, the processor 120 may determine whether the reference item is included in the view.

When it is determined that the reference item is not included therein (No in operation 1831) based on the result of the determination in operation 1831, the processor 120 may extract a default color in operation 1833. When the reference item is not included in the view, the processor 120 may be configured to extract a preset default color.

In operation 1835, the processor 120 may gradually configure default colors in the target item. According to an embodiment, the processor 120 may gradually change the color of the target item on the basis of one or more preset default colors.

When it is determined that the reference item is included in the view (Yes in operation 1831) based on the result of the determination in operation 1831, the processor 120 may determine whether the number of reference items in the view is plural in operation 1841. According to an embodiment, the target item may be located near an upper part, a lower part, a left part, or a right part of the reference item, or may be located near at least two parts (for example, the upper part and the lower part) of the upper part, the lower part, the left part, and the right part of the reference item.

When it is determined that the number of reference items is plural (Yes in operation 1841) based on the result of the determination in operation 1841, the processor 120 may proceed to operation 1843 and perform operation 1843 and subsequent operations. When it is determined that the number of reference items is not plural (No in operation 1841) based on the result of the determination in operation 1841, the processor 120 may proceed to operation 1861 and perform operation 1861 and subsequent operations.

In operation 1843, the processor 120 may determine whether the target item is located between the reference items. According to an embodiment, the processor 120 may determine whether the target item is a target item corresponding to a first condition.

When it is determined that the target item is located between the reference items (Yes in operation 1843) based on the result of the determination in operation 1843, the processor 120 may determine (identify) respective colors corresponding to the plurality of reference items in operation 1851. According to an embodiment, when the number of reference items is two, the processor 120 may extract two colors (for example, a first color of the first reference item and a second color of the second reference item) corresponding to the two reference items (for example, the first reference item and the second reference item).

In operation 1853, the processor 120 may apply the color of the target item on the basis of the color of at least one reference item. According to an embodiment, when the target item is located between a plurality of reference items but is referenced by a color of one reference item (for example, when the target item is located nearer the one reference item based on a distance between the first reference item and the second reference item), the processor 120 may apply the color of the target item on the basis of the color of the corresponding reference item. According to an embodiment, when the target item is located between a plurality of reference items and is referenced by colors of the plurality of reference items (for example, when the target item is located in the middle of the reference items based on a distance between the first reference item and the second reference item), the processor 120 may mix and apply colors according to a configured scheme such that the colors of the target item are harmonized (for example, color-balanced) on the basis of the colors of the plurality of reference items (for example, a first color of the first reference item adjacent to an upper part of the target item and a second color of the second reference item adjacent to a lower part of the target item). According to an embodiment, the processor 120 may apply the colors such that a color 1-1 derived from (associated with) the first color of the first reference item and a color 2-1 derived from (associated with) the second color of the second reference item occupy the same ratio (or same area) of the target item.

When it is determined that the target item is not located between the reference items (No in operation 1843) based on the result of the determination in operation 1843, the processor 120 may determine (identify) the colors of the reference items in operation 1861. The processor 120 may extract the color on the basis of representative information of the reference item.

In operation 1863, the processor 120 may apply the color of the target item on the basis of the color of the reference item. According to an embodiment, the processor 120 may configure the color of the target item on the basis of the color of the reference item corresponding to the target item. Based on the corresponding reference item, the processor 120 may configure color-based representative information of the reference item with respect to at least one target item from the target item adjacent to the reference item to the target item near the reference item.

As described above, a method of operating an electronic device may include an operation of acquiring item information related to items in a content view in response to detection of a request for executing the content view, an operation of dividing the items into a reference item and a target item in the content view based on the acquired item information, an operation of acquiring representative information based on the reference item, and an operation of configuring a color-based representative image of the target item based at least partially on the acquired representative information.

According to various embodiments, the reference item may include an item displayed based on representative information in the content view, and the target item may include an item having no representative information in the content view or an item which has representative information but to which the representative information has not been applied in the content view.

According to various embodiments, the item information may include information related to the existence or non-existence of the representative information or information on a display state of the representative information.

According to various embodiments, the operation of dividing the items may include an operation of determining the reference item and the target item according to whether the items have representative information in the content view.

According to various embodiments, the operation of dividing the items may include an operation of determining a state of the reference item having the representative information and configuring the reference item as the target item based on a state of the reference item.

According to various embodiments, the operation of configuring the representative image may include an operation of, when a number of reference items is plural, extracting a color corresponding to each of a plurality of reference items and an operation of determining a color of the target item based on a color of at least one reference item adjacent to or near the target item.

According to various embodiments, the operation of configuring the representative image may include an operation of, when a single reference item is included in the content view, sequentially applying a color of at least one target item from a target item adjacent to the reference item to a target item near the reference item based on a color of the single reference item.

According to various embodiments, the operation of configuring the representative image may include an operation of, when a plurality of reference items is included in the content view, extracting a color corresponding to each of the plurality of reference items, an operation of distinguishing the target item from the plurality of reference items, an operation of, when the target item corresponds to a first condition, configuring a mixed color of the target item based on colors of the reference items, and an operation of, when the target item is a target item corresponding to a second condition, configuring a color of the target item based on a color of the corresponding reference item related to the target item.

According to various embodiments, the target item corresponding to the first condition may include one or more items existing between the plurality of reference items and referenced by colors of the plurality of reference items and the target item corresponding to the second condition may include one or more items contiguous only with one of the plurality of reference items and referenced by a color of the one reference item.

According to various embodiments, the operation of configuring the mixed color may include an operation of, when the target item exists between a plurality of reference items but is referenced by a color of one reference item, configuring a color of the target item based on the color of the corresponding reference item, and an operation, when the target item exists between the plurality of reference items and is referenced by colors of the plurality of reference items, configuring a mixed color of the target item based on colors of the plurality of reference items.

The embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. An electronic device comprising:
a display device configured to display a content view; and
a processor,
wherein the processor is configured to:
in response to detection of a request for executing the content view,
divide items into at least one reference item and a plurality of target items in the content view,
extract a color corresponding to each of the at least one reference item, based on representative information of each of the at least one reference item, and
configure a color-based representative image of each of the plurality of target items, such that gradual colors acquired based on a color extracted from a reference item adjacent to each of the plurality of target items are sequentially applied to the plurality of target items.

2. The electronic device of claim 1,
wherein the processor is further configured to determine the at least one reference item and the plurality of target items according to whether the items have representative information in the content view,
wherein the at least one reference item includes an item displayed based on representative information in the content view, and
wherein the plurality of target items includes an item having no representative information in the content view or an item which has representative information but to which the representative information has not been applied in the content view.

3. The electronic device of claim 1, wherein the processor is further configured to:
determine a state of the at least one reference item having the representative information, and
include the at least one reference item in the plurality of target items based on a state of the at least one reference item.

4. The electronic device of claim 1, wherein, when a single reference item is included in the content view, the processor is further configured to sequentially apply a color of the plurality of target items from a target item adjacent to the reference item to a target item near the reference item based on a color of the single reference item.

5. The electronic device of claim 1, wherein, when a plurality of reference items is included in the content view, the processor is further configured to:
extract a color corresponding to each of the plurality of reference items,
distinguish the plurality of target items from the plurality of reference items,
when a target item corresponds to a first condition, configure a mixed color of the target item based on colors of the reference items, and
when a target item corresponds to a second condition, configure a color of the target item based on a color of a corresponding reference item related to the target item.

6. The electronic device of claim 5,
wherein the target item corresponding to the first condition includes one or more items existing between the plurality of reference items and referenced by colors of the plurality of reference items, and
wherein the target item corresponding to the second condition includes one or more items contiguous only with one of the plurality of reference items and referenced by a color of the one reference item.

7. The electronic device of claim 5,
wherein, when a target item exists between a plurality of reference items but is referenced by a color of one reference item, the processor is further configured to configure a color of the target item based on a color of a corresponding reference item and
wherein, when a target item exists between the plurality of reference items and is referenced by colors of the plurality of reference items, configure a mixed color of the target item based on colors of the plurality of reference items.

8. A method of operating an electronic device, the method comprising:
in response to detection of a request for executing the content view,
dividing items into at least one reference item and a plurality of target items in a content view;
extracting a color corresponding to each of the at least one reference item, based on representative information of each of the at least one reference item; and
configuring a color-based representative image of each of the plurality of target items, such that gradual colors acquired based on a color extracted from a reference item adjacent to each of the plurality of target items are sequentially applied to the plurality of target items.

9. The method of claim 8,
wherein the dividing of the items comprises determining the at least one reference item and the plurality of target items according to whether the items have representative information in the content view,
wherein the at least one reference item includes an item displayed based on representative information in the content view, and
wherein the plurality of target items includes an item having no representative information in the content view or an item which has representative information but to which the representative information has not been applied in the content view.

10. The method of claim 8, wherein the dividing of the items comprises determining a state of the at least one reference item having the representative information and configuring the at least one reference item as the plurality of target items based on a state of the at least one reference item.

11. The method of claim 8, wherein the configuring of the representative image comprises:
when a single reference item is included in the content view, sequentially applying a color of the plurality of target items from a target item adjacent to the reference item to a target item near the reference item based on a color of the single reference item;
when a plurality of reference items is included in the content view, extracting a color corresponding to each of the plurality of reference items;
distinguishing the plurality of target items from the plurality of reference items;
when a target item corresponds to a first condition, configuring a mixed color of the target item based on colors of the reference items; and
when a target item corresponds to a second condition, configuring a color of the target item based on a color of a corresponding reference item related to the target item.

12. The method of claim 11,
wherein the target item corresponding to the first condition includes one or more items existing between the plurality of reference items and referenced by colors of the plurality of reference items, and
wherein the target item corresponding to the second condition includes one or more items contiguous only with one of the plurality of reference items and referenced by a color of the one reference item.

13. The method of claim 11, wherein the configuring of the mixed color comprises:
when a target item exists between a plurality of reference items but is referenced by a color of one reference item, configuring a color of the target item based on a color of a corresponding reference item; and
when a target item exists between the plurality of reference items and is referenced by colors of the plurality of reference items, configuring a mixed color of the target item based on colors of the plurality of reference items.

* * * * *